(12) United States Patent
Kawabata et al.

(10) Patent No.: US 7,924,171 B2
(45) Date of Patent: Apr. 12, 2011

(54) PARKING ASSIST APPARATUS AND METHOD

(75) Inventors: Yukiko Kawabata, Toyota (JP); Yasushi Makino, Mishima (JP); Yuichi Kubota, Okazaki (JP); Tomohiko Endo, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 300 days.

(21) Appl. No.: 12/293,559

(22) PCT Filed: Feb. 28, 2007

(86) PCT No.: PCT/JP2007/053823
§ 371 (c)(1),
(2), (4) Date: Sep. 19, 2008

(87) PCT Pub. No.: WO2007/122861
PCT Pub. Date: Nov. 1, 2007

(65) Prior Publication Data
US 2010/0283632 A1    Nov. 11, 2010

(30) Foreign Application Priority Data
Apr. 25, 2006 (JP) ................................. 2006-120973

(51) Int. Cl.
*B60Q 1/48* (2006.01)
*B60Q 1/00* (2006.01)

(52) U.S. Cl. ......... 340/932.2; 367/103; 701/35; 701/36; 701/42; 340/435; 340/439; 348/148

(58) Field of Classification Search ............... 340/932.2, 340/426.22, 426.23, 435, 436, 437; 280/761; 342/70, 71, 72; 701/24–29; 348/148
See application file for complete search history.

(56) References Cited

U.S. PATENT DOCUMENTS

| 7,085,634 | B2 * | 8/2006 | Endo et al. ............... 701/36 |
| 2004/0020699 | A1 * | 2/2004 | Zalila et al. ............. 180/204 |

FOREIGN PATENT DOCUMENTS

| DE | 10 2005 017 361 A | 11/2005 |
| DE | 10 2005 015 396 A | 12/2005 |
| JP | 2003 81042 | 3/2003 |
| JP | 2003 270344 | 9/2003 |
| JP | 2004 291867 | 10/2004 |
| JP | 2005-9992 | 1/2005 |
| JP | 2005 67263 | 3/2005 |
| JP | 2005-178464 | 7/2005 |

OTHER PUBLICATIONS

Office Action issued Oct. 15, 2010, in Korea Patent Application No. 10-2008-7025718 (with English translation).

* cited by examiner

*Primary Examiner* — Benjamin C Lee
*Assistant Examiner* — Peter C Mehravari
(74) *Attorney, Agent, or Firm* — Oblon, Spivak, McClelland, Maier & Neustadt, L.L.P.

(57) ABSTRACT

A parking assisting apparatus and method that can precisely estimate the orientation of a parking space. A parking assisting apparatus for assisting parking a vehicle includes an obstacle detecting mechanism that detects an obstacle near the vehicle and an orientation information acquiring mechanism that acquires information as to an orientation of the vehicle. The apparatus estimates an orientation of the parking space that may exist near the vehicle based on the detection result of the obstacle detecting mechanism and the orientation information.

13 Claims, 15 Drawing Sheets

TRAVEL DIRECTION

PARKING SPACE

PARKING SPACE

PARKING SPACE

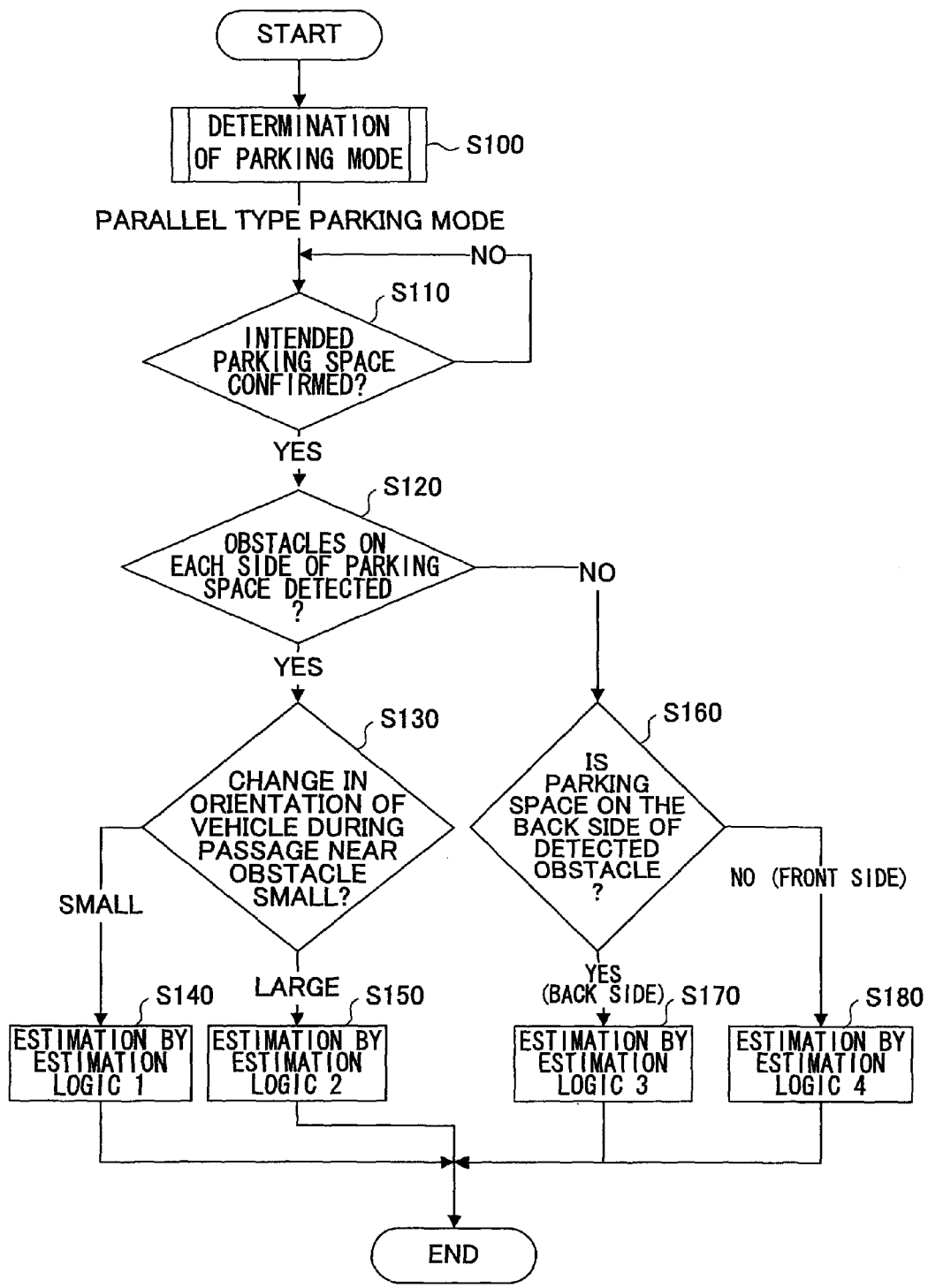

PARKING ASSIST APPARATUS AND METHOD

TECHNICAL FIELD

The present invention relates to a parking assisting apparatus and method for assisting parking a vehicle.

BACKGROUND ART

JP2003-81042 A discloses a parking assisting apparatus comprising a first sensor for measuring a distance with respect to an obstacle in a lateral direction of the vehicle, a second sensor for measuring a travel distance of the vehicle, a yaw angle detector for detecting a yaw angle of the vehicle, guiding means for outputting guidance information as to operations of the vehicle to a driver, and a controller configured to estimate an initial stop location based on measurements of the distance and the travel distance obtained in the course of moving the vehicle forward toward the initial stop location, and provide the driver with timing information suited to start to move the vehicle backward for parking via the guiding means based on measurements of the yaw angle and the estimated initial stop location.

Further, JP2003-270344 A discloses a technique for determining a target orientation of the vehicle to be implemented at parking by obtaining distance information between the vehicle and another parked vehicle using distance-measuring sensors such as a sonar sensor or the like, detecting parking space available for parking based on the obtained distance information, detecting a side of another parked vehicle adjacent to the detected parking space, and determining the target orientation based on the detected side of the other parked vehicle such that the side of the vehicle within the parking space will be parallel to the detected side of the other parked vehicle.

By the way, there is a stage as a pre-parking stage in which the driver moves the vehicle toward a parking start position. In this stage, the driver generally tends to move the vehicle toward the parking start position after driving the vehicle near the desired parking space. At this time, if the system can estimate the orientation of the parking space, it is possible to start to perform a parking assist (for example, a parking assist for the stage in which the driver moves the vehicle toward the parking start position) in an earlier stage using the estimated orientation. However, there are many travel patterns of the vehicle near the parking space. For example, there is a case in which the driver moves the vehicle in such a manner that the vehicle passes in a slanting direction with respect to the front side of the parking space. Thus, with a simplified configuration, it is difficult to precisely estimate the orientation of the parking space.

DISCLOSURE OF INVENTION

Therefore, it is an object of the present invention to provide a parking assisting apparatus and method which can precisely estimate the orientation of the parking space with a simplified configuration.

In order to achieve the aforementioned objects, according to the first aspect of the present invention, a parking assisting apparatus for assisting parking a vehicle comprises;

obstacle detecting means for detecting an obstacle near the vehicle; and orientation information acquiring means for acquiring information as to an orientation of the vehicle, wherein said apparatus estimates an orientation of a parking space which may exist around the vehicle based on the detection result of the obstacle detecting means and the orientation information.

According to the second aspect of the present invention, in the first aspect of the present invention, if the orientation of the vehicle changes more than a predetermined angle after a first obstacle is detected, said apparatus estimates the orientation of the parking space based on the orientation of the vehicle at the time when the vehicle passes near a second obstacle. With this arrangement, it becomes possible to perform the estimation of the orientation of the parking space in accordance with the various travel patterns.

According to the third aspect of the present invention, in the first or the second aspect of the present invention, if the orientation of the vehicle changes more than a predetermined angle after a first obstacle is detected, said apparatus estimates the orientation of the parking space based on the orientation of the vehicle at the time when the vehicle passes near a second obstacle. With this arrangement, it becomes possible to perform the estimation of the orientation of the parking space in accordance with the various travel patterns.

According to the fourth aspect of the present invention, in one of any aforementioned aspects of the present invention, if a second obstacle is not detected within a predetermined distance after a first obstacle is detected, said apparatus estimates the orientation of the parking space based on the orientation of the vehicle at the time when the vehicle passes near the first obstacle. With this arrangement, it becomes possible to perform the estimation of the orientation of the parking space in accordance with the various existence situations of the obstacle(s).

According to the fifth aspect of the present invention, a parking assisting method of assisting parking a vehicle comprises;

an obstacle detecting step for detecting an obstacle near the vehicle; and an orientation information acquiring step for acquiring information as to an orientation of the vehicle, wherein if it is determined based on the detection result of the obstacle detecting step and the orientation information acquired in the orientation information acquiring step that the orientation of the vehicle changes more than a predetermined angle after a first obstacle is detected, said method estimates the orientation of parking space based on the orientation of the vehicle at the time when the vehicle passes near a second obstacle.

According to the sixth aspect of the present invention, a parking assisting method of assisting parking a vehicle comprises;

an obstacle detecting step for detecting an obstacle near the vehicle; and an orientation information acquiring step for acquiring information as to an orientation of the vehicle, wherein if it is determined based on the detection result of the obstacle detecting step and the orientation information acquired in the orientation information acquiring step that the orientation of the vehicle changes more than a predetermined angle after a first obstacle is detected, said method estimates the orientation of parking space based on the orientation of the vehicle at the time when the vehicle passes near a second obstacle.

According to the seventh aspect of the present invention, a parking assisting method of assisting parking a vehicle comprises;

an obstacle detecting step for detecting an obstacle near the vehicle; and an orientation information acquiring step for acquiring information as to an orientation of the vehicle, wherein if it is determined based on the detection result of the obstacle detecting step and the orientation information acquired in the orientation information acquiring step that a second obstacle is not detected within a predetermined distance after a first obstacle is detected, said method estimates the orientation of parking space based on the orientation of the vehicle at the time when the vehicle passes near the first obstacle.

According to the aforementioned aspects of the present invention, a parking assisting apparatus and method which can precisely estimate the orientation of the parking space with a simplified configuration can be obtained.

BRIEF DESCRIPTION OF THE DRAWINGS

These and other objects, features, and advantages of the present invention will become more apparent from the following detailed description of preferred embodiments given with reference to the accompanying drawings, in which:

FIG. 8 is a flowchart of angle estimation process in a parallel parking mode;

EXPLANATION FOR REFERENCE NUMBER

| 10 | parking assisting apparatus |
|----|------------------------------|
| 12 | parking assisting ECU |
| 16 | steering angle sensor |
| 18 | vehicle speed sensor |
| 20 | back monitoring camera |
| 22 | display |
| 30 | steering system ECU |
| 42 | parking space detecting section |
| 43 | deflection angle calculating section |
| 44 | parking start position calculating section |
| 48 | target track calculating section |
| 50 | reverse shift switch |
| 52 | parking switch |
| 70 | distance-measuring sensor |

BEST MODE FOR CARRYING OUT THE INVENTION

In the following, the best mode for carrying out the present invention will be described in detail by referring to the accompanying drawings.

Figure 1:
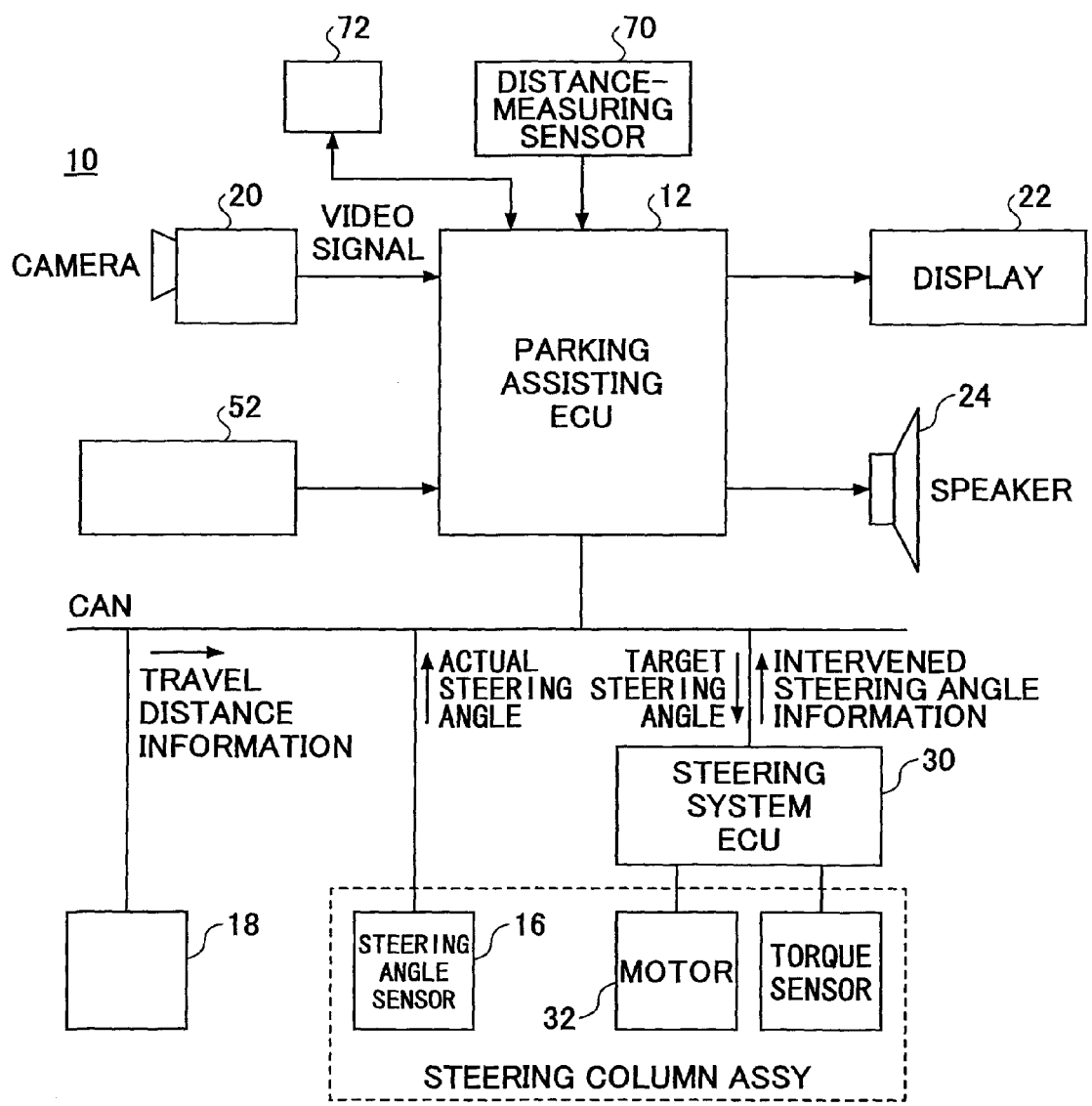
FIG. 1 is a schematic system diagram of an embodiment of a parking assisting apparatus 10 according to the present invention.

FIG. 1 is a system diagram of an embodiment of a parking assisting apparatus 10 according to the present invention. As shown in FIG. 1, the parking assisting apparatus 10 is comprised mainly of an electronic control unit 12 (hereafter referred to as a parking assisting ECU 12). The parking assisting ECU 12 is comprised mainly of a microprocessor that includes a CPU, a ROM, a RAM, etc., (not shown) which are interconnected via appropriate buses. In the ROM is stored the computer readable programs to be carried out by the CPU and data.

The parking assisting ECU 12 is connected to a steering angle sensor 16 for detecting the steering angle of the steering wheel (not shown), and a vehicle speed sensor 18 for detecting the speed of the vehicle, via appropriate buses such as a CAN (Controller Area Network) or a high-speed communication bus. The vehicle speed sensor 18 may be wheel speed sensors provided on individual wheels, each of which generates pulse signals according to the rotating speed of the corresponding wheel.

The parking assisting ECU 12 is connected to a distance-measuring sensor 70 which measures the distance with respect to an obstacle using sound waves (for example, sonic waves), radio waves (for example, millimeter waves), light waves (for example, lasers), etc. The distance-measuring sensor 70 may be any means which can detect a distance such as a stereo vision camera, other than laser radar, millimeter wave radar, and sonic wave sonar, for example. The distance-measuring sensor 70 is provided on either side of the front body of the vehicle.

Figure 2:
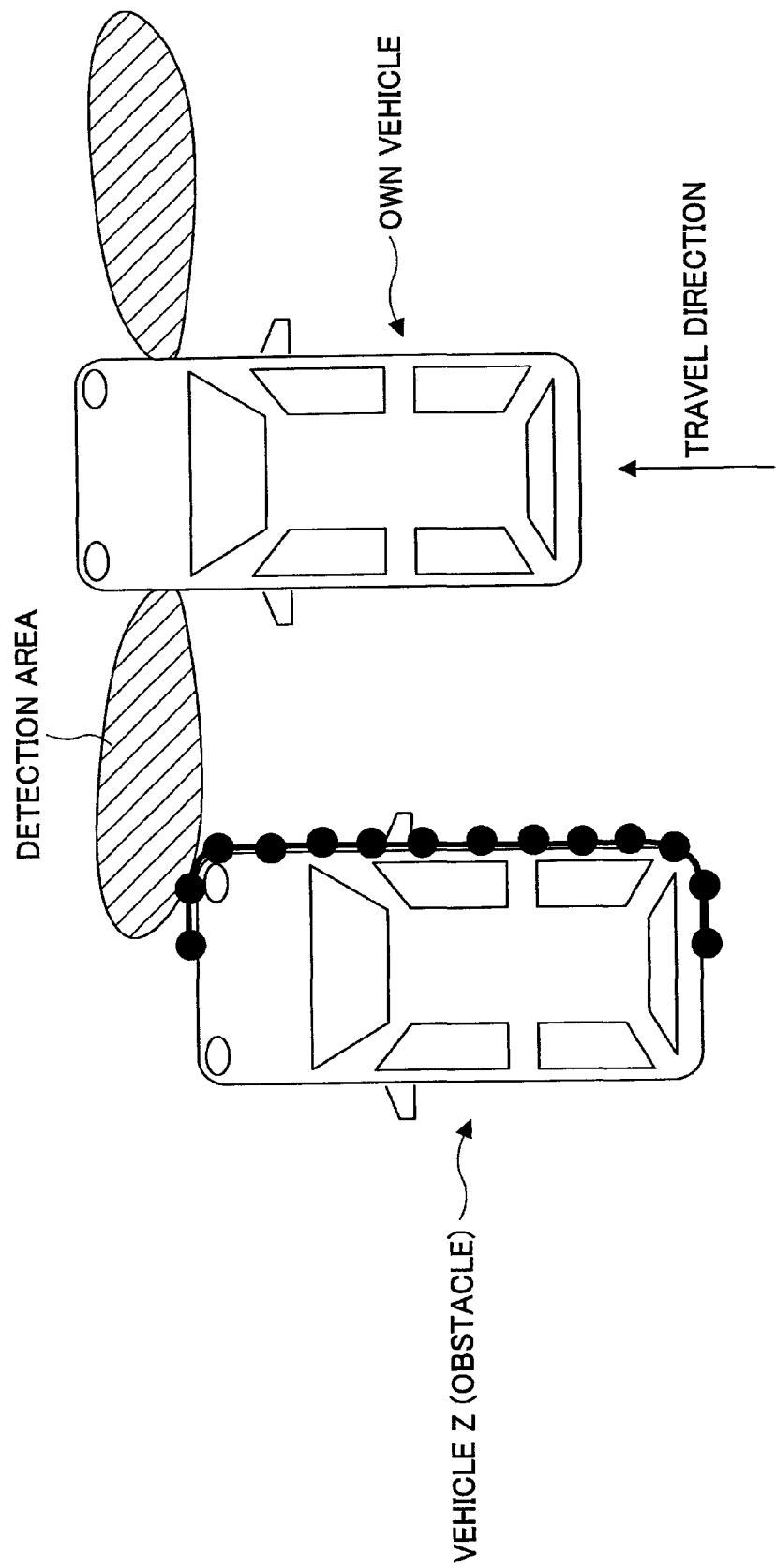
FIG. 2 is a diagram for illustrating how the distance-measuring sensor 70 detects the distance with respect to the object to be detected.

The distance-measuring sensor 70 detects the distance with respect to the obstacle located on the side of the vehicle by emitting sound waves or the like in a predetermined area, and then receiving the reflected waves, as shown in FIG. 2. The distance-measuring sensor 70 may be disposed near a bumper of the front body of the vehicle and may emit sound waves or the like in a slanting forward direction which forms an angle ranging from 17 degrees to 20 degrees with respect to the lateral direction of the vehicle, for example. The distance-measuring sensor 70 may output a row of points (i.e., a group comprised of reflected points of the sound waves) representing reflections from portions of the obstacle. The output data may be stored periodically in a memory 72 (for example, EEPROM).

The parking assisting ECU 12 is also connected to a reverse shift switch 50 and a parking switch 52. The reverse shift switch 50 outputs an ON signal when a shift lever is shifted to the reverse position and otherwise outputs an OFF signal. The parking switch 52 is provided in the cabin of the vehicle so as to allow a user in the cabin to operate it. The parking switch 52 outputs an OFF signal in its normal state and outputs an ON signal when operated by the user.

The parking assisting ECU 12 determines whether the user needs assistance in parking the vehicle based on the output signal of the parking switch 52. The parking assisting ECU 12 starts parking assist control for assisting the vehicle's travel to a target parking position in the parking space, as soon as the parking switch 52 is turned on during the travel of the vehicle. The parking assist control includes not only vehicle control in the course of travel to the target parking position, such as steering control, but also information output to the driver such as a guide message for guiding the vehicle to the parking start position.

Figure 3:
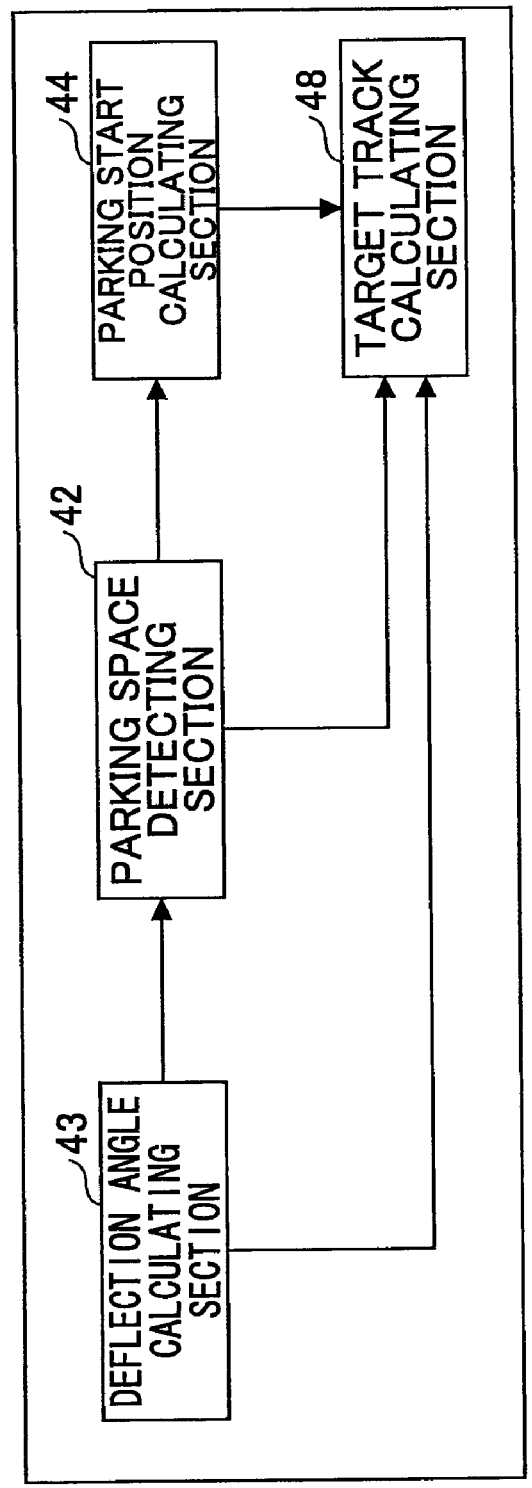
FIG. 3 is a functional diagram for illustrating main functions of the parking assisting ECU 12 according to the present embodiment.

FIG. 3 is a functional diagram for illustrating main functions of the parking assisting ECU 12 according to the present embodiment. The parking assisting ECU 12 includes a parking space detecting section 42, a deflection angle calculating section 43, a parking start position calculating section 44, and a target track calculating section 48. In the following, the configurations and functions of the respective sections will be described.

The parking space detecting section 42 detects parking spaces, which may be located on the side of the vehicle, based on the detection result (i.e., row of points) of the distance-measuring sensor 70. The parking space detecting section 42 detects the parking spaces, which may be located on either side of the vehicle, based on the detection result of the distance-measuring sensors 70 provided on either side of the vehicle. The parking spaces located on each side of the vehicle are detected separately and concurrently. The detecting way can be the same on either side of the vehicle, so in the following, the detecting way related to one side of the vehicle is explained unless otherwise specified.

The way of detecting the parking spaces is different between parallel parking and tandem parking. In the following, one example of the way of detecting the parking spaces for parallel parking is explained first, and then one example of the way of detecting the parking spaces for tandem parking is explained. It is noted that the parking switch 52 may include a switch for specifying parallel parking or tandem parking. In this case, the parking assisting ECU 12 operates in a parking mode (i.e., parallel parking mode or tandem parking mode) according to the specified parking mode.

[Method of Detecting Parking Spaces for Parallel Parking]

Figure 4:
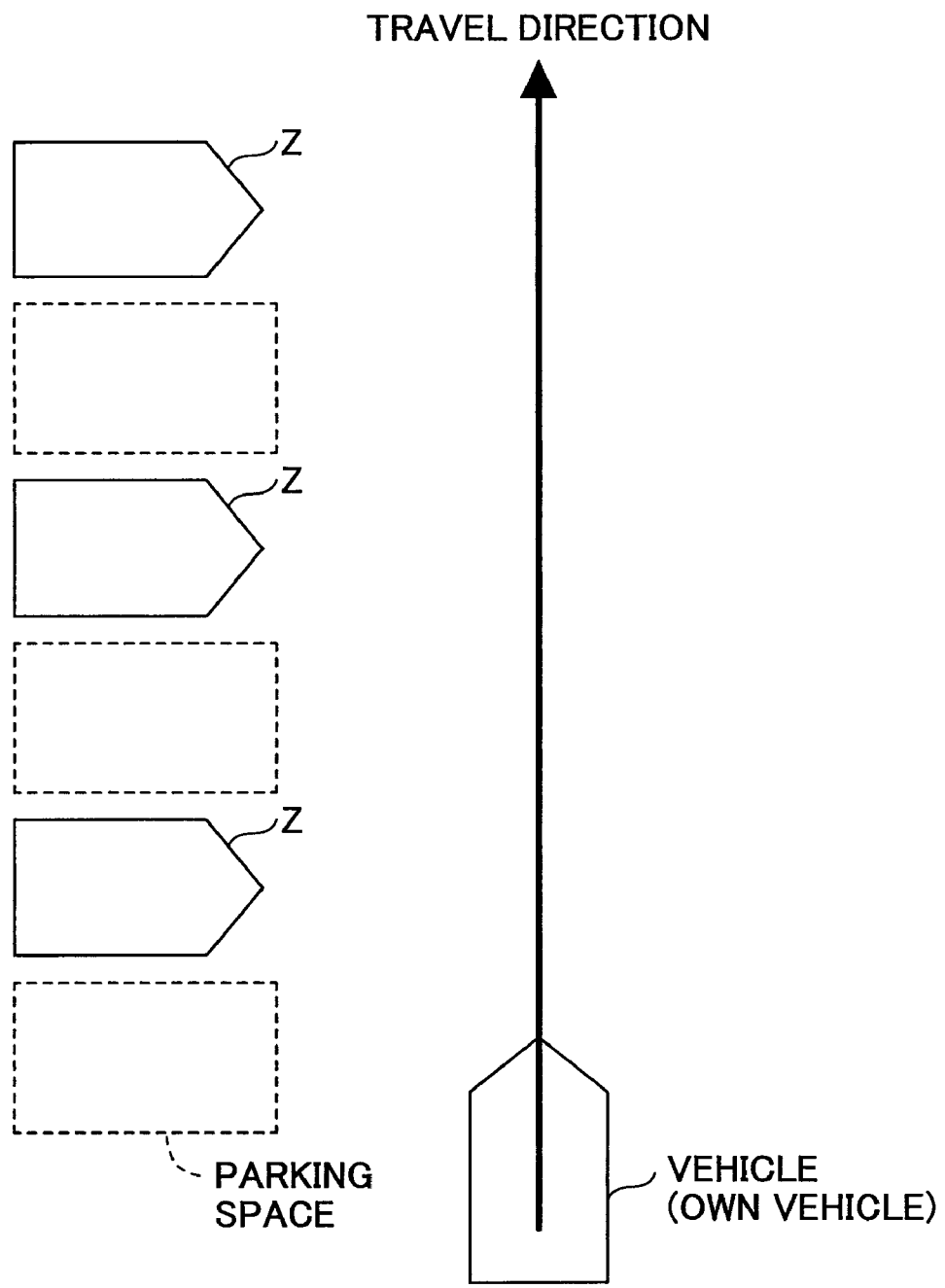
FIG. 4 is a plan view illustrating a certain situation of the parking area for parallel parking.

FIG. 4 is a plan view illustrating a certain situation of the parking area for parallel parking, in which situation several parking spaces exist on either side of the vehicle (as indicated by rectangles of dotted lines, and the obstacles (in this example, other parked vehicles Z) exist adjacent to the parking spaces. In FIG. 4, it is assumed that the vehicle (i.e., own vehicle) passes on the side of the obstacles (and thus the parking spaces between them) in the direction indicated by the arrow in the drawing. It is noted that the terms "back side" and "front side" are defined using the traveling direction of the vehicle (i.e., own vehicle) as a reference.

At first, as a premise, it should be understood that when the vehicle travels on the side of a certain obstacle, the area of the obstacle detected by the distance-measuring sensor 70 (i.e., the length of the row of points) becomes larger as the vehicle travels. The parking space detecting section 42 in this example determines the existence of the obstacle in a three-step manner based on the detection results of the distance-measuring sensor 70.

The first step corresponds to a stage in which the obstacle starts to be detected. For example, the first step corresponds to a stage in which the length of the row of points is smaller than 1 m. The parking space detecting section 42 sets a flag (hereafter referred to as a detection starting flag) which represents that there may be an obstacle-like object on the side of vehicle when the length of the row of points becomes greater than or equal to 80 cm, for example. Here, the reason why the term "obstacle-like object" is used instead of obstacle is because there is the possibility of noise when the length of the row of points is smaller than 1 m.

The second step corresponds to an intermediate stage and corresponds to a stage in which the length of the row of points becomes greater than or equal to 1 m, for example. The parking space detecting section 42 sets a flag (hereafter referred to as a tentative flag) which represents that the obstacle is detected tentatively.

The third step corresponds to a final stage. The third step corresponds to a stage in which the length of a section in which there is no row of points becomes greater than or equal to 50 cm after the length of the row of points becomes greater than a predetermined length (>1 m). In this situation, it can be determined that the overall obstacle is detected. Therefore, the parking space detecting section 42 sets a flag (hereafter referred to as a detection completion flag) which represents that the obstacle exists on the side of the vehicle and the detection of the obstacle has been completed.

The parking space detecting section 42 determines that there is a parking space on the side of the vehicle, if the length of a section in which there is no row of points after the detection completion flag has been set becomes greater than or equal to a predetermined length (2 m, for example), and sets a flag (hereafter referred to as a parking space available flag) which represents as such. In this example, if the row of points whose length is greater than a predetermined length (>1 m) is detected and then the length of a section in which there is no row of points becomes greater than or equal to a predetermined length L1 m, the parking space detecting section 42 determines that there is a parking space on the back side of the obstacle related to the set detection completion flag and sets the parking space available flag. The predetermined length L1 corresponds to a minimum opening width which is necessary as a parking space for parallel parking. The predetermined length L1 is a value which should be defined depending on the width of the own vehicle. It is noted that the predetermined length L1 is 2.5 m in this example.

If the parking space available flag is set, a notice which informs the driver that there is a parking space detected on the side of the vehicle may be output. This notice may be output audibly and/or visually. With this arrangement, the driver can grasp that there is a parking space available on the side of the vehicle. Thus, the burden of detecting the parking space with the driver's own eyes can be reduced.

[Method of Detecting Parking Spaces for Tandem Parking]

Figure 5:
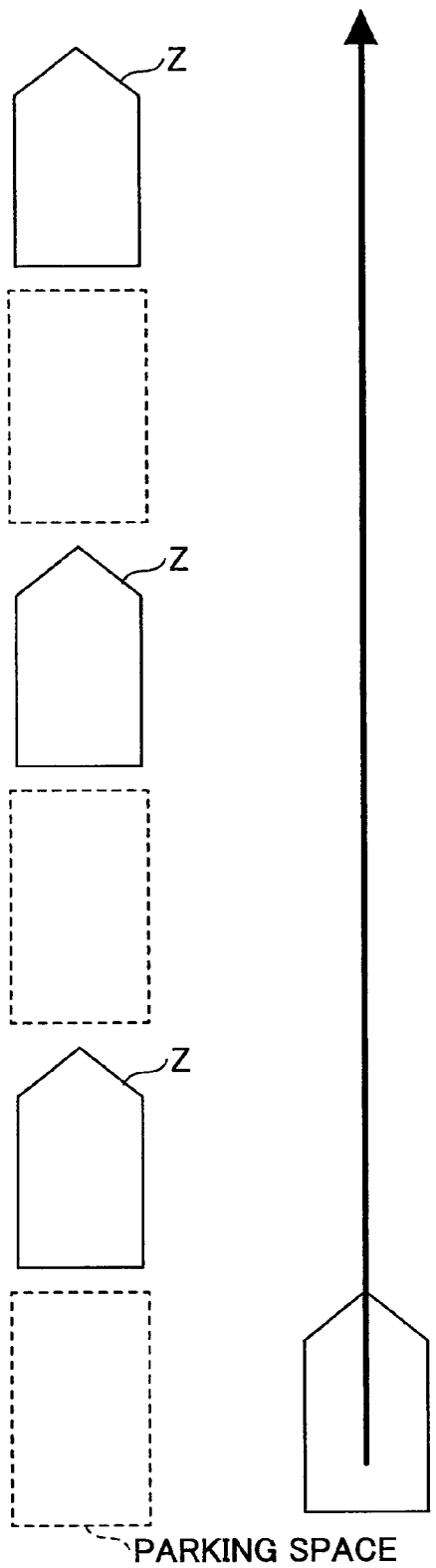
FIG. 5 is a plan view illustrating a certain situation of the parking area for tandem parking.

FIG. 5 is a plan view illustrating a certain situation of the parking area for tandem parking, in which situation several parking spaces exist on either side of the vehicle (as indicated by rectangles of dotted lines, and the obstacles (in this example, other parked vehicles Z) exist adjacent to the parking spaces. In FIG. 5, it is assumed that the vehicle (i.e., own vehicle) passes on the side of the obstacles (and thus the parking spaces between them) in the direction indicated by the arrow in the drawing.

In the case of tandem parking, the parking space detecting section 42 determines the existence of the obstacle in a three-step manner based on the detection results of the distance-measuring sensor 70.

Specifically, the parking space detecting section 42 sets the detection starting flag when the length of the row of points becomes greater than or equal to 1.0 m, for example. Further, the parking space detecting section 42 sets the tentative flag when the length of the row of points becomes greater than or equal to 2.0 m, for example. Further, the parking space detecting section 42 sets the detection completion flag, if the row of points whose length is greater than a predetermined length (>2 m) is detected and then no row of points can be detected for a length greater than or equal to 50 cm.

If the row of points appears and the tentative flag is set in the status where there has been no row of points for a length greater than or equal to a predetermined length L2 m, the parking space detecting section 42 determines that there is a parking space on the side of the vehicle and sets the parking space available flag. In other words, if no row of points exists for a length greater than or equal to a predetermined length L2 and then the row of points whose length is greater than or equal to 2 m is detected, the parking space detecting section 42 determines that there is a parking space on the front side of the obstacle related to the set tentative flag and sets the parking space available flag. The predetermined length L2 corresponds to a minimum opening width which is necessary as a parking space for tandem parking. The predetermined length L2 is a value which should be defined depending on the length of the own vehicle. It is noted that the predetermined length L2 is 6 m in this example.

Further, the parking space detecting section 42 determines that there is a parking space on the side of the vehicle, if the length of a section in which there is no row of points after the detection completion flag has been set becomes greater than or equal to a predetermined length (L2-0.5 m, for example), and sets the parking space available flag. In this example, if the row of points whose length is greater than a predetermined length (>2.0 m) is detected and then the length of a section in which there is no row of points becomes greater than or equal to a predetermined length L2 m, the parking space detecting section 42 determines that there is a parking space on the back side of the obstacle related to the set detection completion flag and sets the parking space available flag.

Similarly, if the parking space available flag is set, a notice which informs the driver that there is a parking space detected on the side of the vehicle may be output. With this arrangement, the driver can grasp that there is a parking space available on the side of the vehicle. Thus, the burden of detecting the parking space with the driver's own eyes can be reduced.

It is desirable for the detection result of the distance-measuring sensor 70 to be stored even in the situation where the parking switch 52 is not turned on. With this arrangement, when the parking switch 52 is turned on, it is possible to retrieve the past detection result obtained before the vehicle position at that time, and detect parking spaces, which may be located on the front side of the current vehicle position, based on the retrieved detection result. For this purpose, it is also possible to store only the outputs of the distance-measuring sensor 70 obtained within a predetermined distance before the current vehicle position in the memory 72, using a FIFO technique. With this arrangement, it is possible to efficiently use the capacity of the memory 72.

Next, a parking space angle detection process performed by the parking space detecting section 42 is described.

Figure 6A:
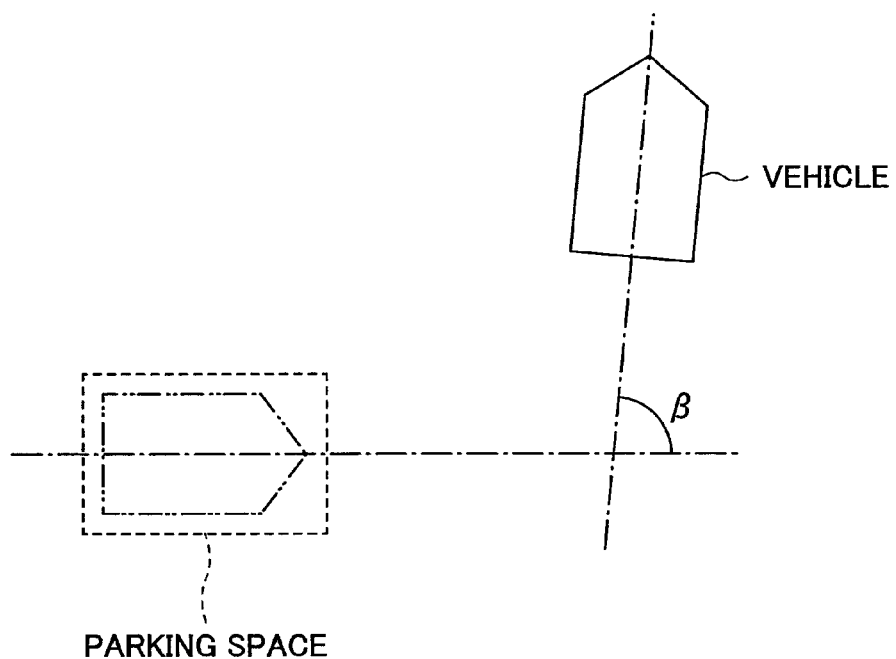
FIG. 6 is a diagram for illustrating an example of the definition of the angle of the parking space.
Figure 6B:
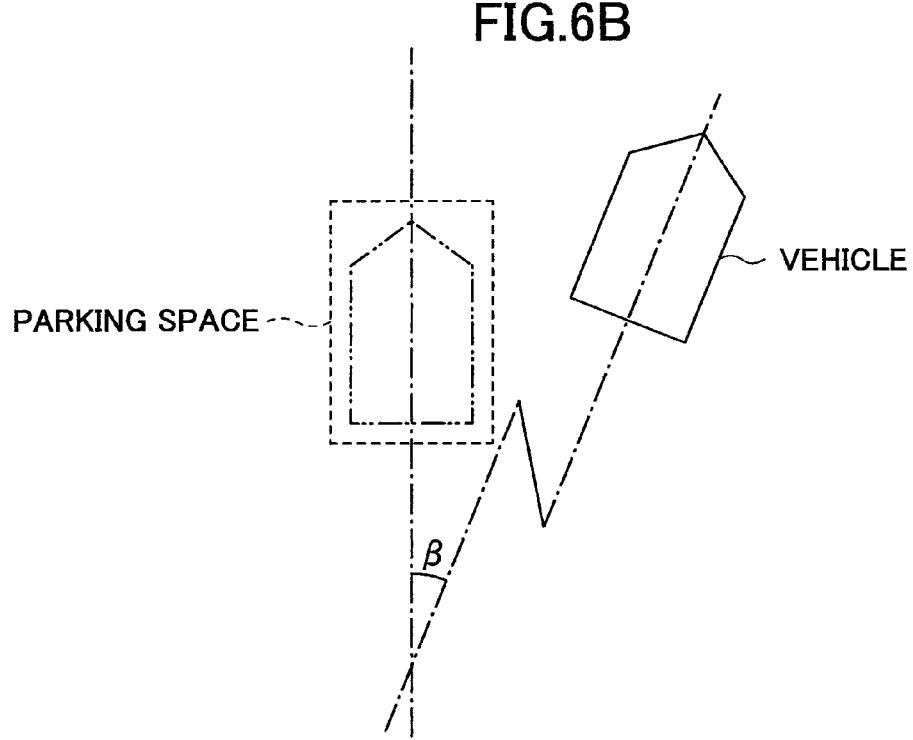

The parking space detecting section 42 estimates the angle of the parking space detected as mentioned above, based on the detection result of the distance-measuring sensor 70 and information as to the orientation of the vehicle (in this example, deflection angle α described below). It is noted that, in this example, the angle of the parking space is defined as a relative angle $\beta$ ($0 \leq \beta \leq 90$) between the longitudinal axis of the parking space and the longitudinal axis of the vehicle (indicated by alternate long and short dashed lines), as is shown in FIG. 6. It is noted that FIG. 6A shows the case of parallel parking and FIG. 6B shows the case of tandem parking. In FIGS. 6A and 6B, an imaginary vehicle parked in the parking space is indicated by a chain double-dashed line. The angle β of the parking space is typically used in determining a target parking direction (i.e., determining a direction in which the vehicle should move to be parked in the parking space).

The way of estimating the angle of the parking spaces is different between parallel parking and tandem parking. In the following, the case of parallel parking is explained first.

[Parking Space Angle Estimation for Parallel Parking]

Since there are more travel patterns near the parking space in parallel parking than in tandem parking, it becomes more difficult to estimate the angle of the parking space in the case of parallel parking. However, the present embodiment makes it possible to precisely estimate the angle of the parking space by utilizing the findings that various travel patterns in parallel parking can be categorized into the two following travel patterns.

Figure 7A:
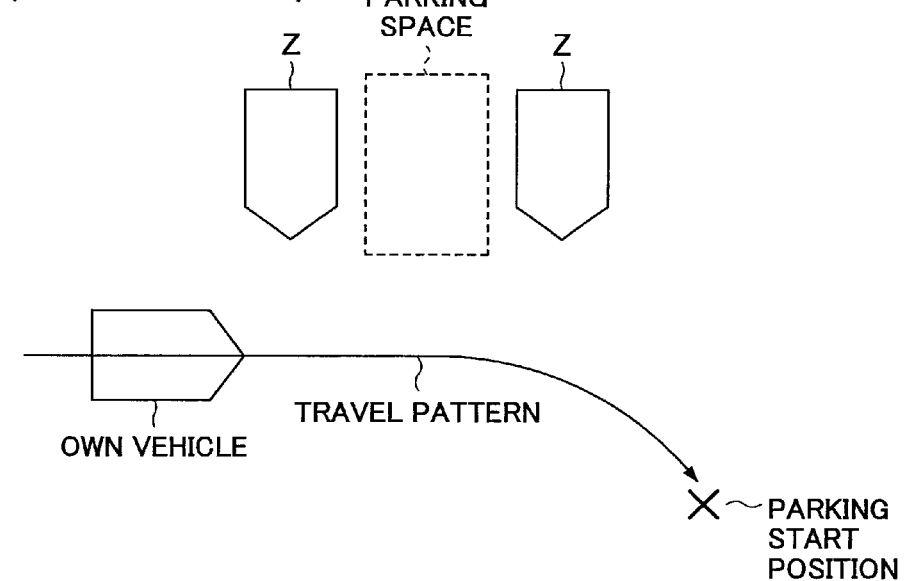
FIG. 7 is a diagram for illustrating a variety of travel patterns related to parallel parking.

<travel pattern 1> In the case of the travel pattern 1, the vehicle passes near the parking space between two obstacles Z while keeping the parallel relationship with respect to the front face of the parking space and reaches the parking start position, as shown in FIG. 7A.

Figure 7B:
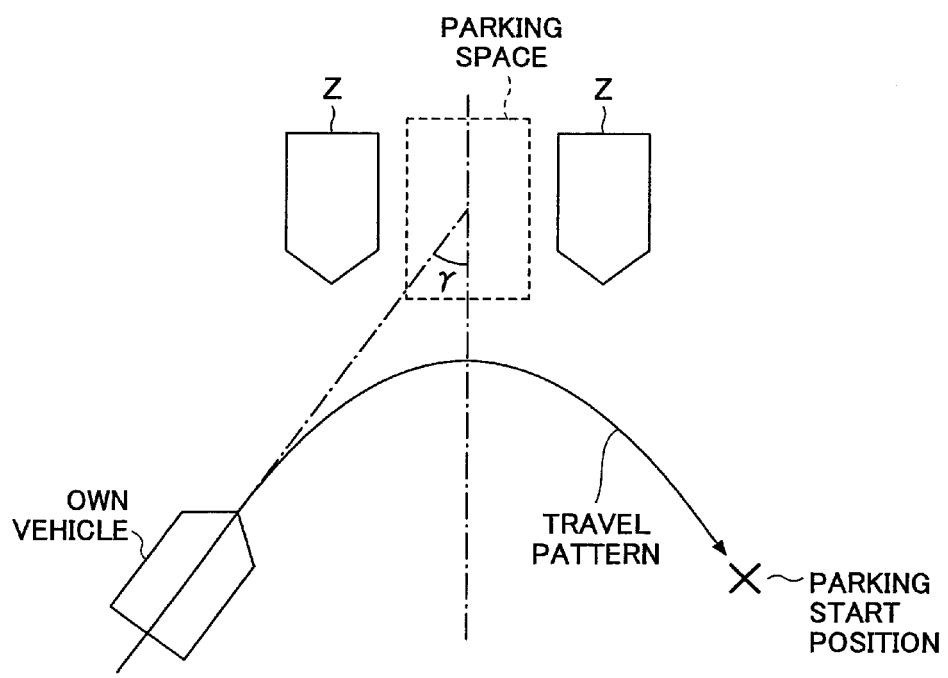

<travel pattern 2> In the case of the travel pattern 2, the vehicle passes near the parking space between two obstacles Z from a slanting direction with respect to the front face of the parking space (from a slanting direction which forms angle γ with respect to the front face of the parking space) and reaches the parking start position, as shown in FIG. 7B. However, in the case of the travel pattern 2, the angle γ is variable depending on the surrounding conditions, habit of the driver or the like.

In the case of the travel pattern 1 as shown in FIG. 7A, it is relatively easy to estimate the angle of the parking space based on the orientation of the vehicle in its straight-ahead movement. In other words, it is possible to implement the precise estimation of the angle β of the parking space by utilizing the fact that the orientation of the vehicle in its straight-ahead movement is parallel to the front face of the parking space.

Therefore, in the present embodiment, it is determined whether the travel pattern detected corresponds to the travel pattern 1 or the travel pattern 2, based on the variation in orientation of the vehicle (deflection angle α described below) when the vehicle passes near the first obstacle. In the travel pattern 1, the orientation of the vehicle doesn't change greatly when the vehicle passes near the first obstacle, while in the travel pattern 2, the orientation of the vehicle changes greatly when the vehicle passes near the first obstacle. In other words, since a steering operation is necessary so as to make the angle γ 90 degrees when the vehicle passes near the first obstacle in the travel pattern 2, the orientation of the vehicle changes correspondingly.

Further, the present embodiment makes it possible to precisely estimate the angle β of the parking space by utilizing the findings that even in the travel pattern 2 there is a general tendency at the point where the steering operation finishes for making the angle γ 90 degrees, that is to say the point where the orientation of the vehicle becomes substantially parallel to the front face of the parking space, while the angle γ is variable depending on the surrounding conditions, habits of the driver or the like.

Specifically, there is a general tendency such that the point where the orientation of the vehicle becomes substantially parallel to the front face of the parking space corresponds to the point where the vehicle has just passed the front end of the front body of the second obstacle (which is described below in relation to FIG. 10B). This tendency was also shown by experiment by the inventors. It is noted that this tendency is based on the cornering characteristics of the vehicle such that it becomes easy to move the vehicle to the parking start position optimal for the parking space if the orientation of the vehicle is parallel to the front face of the parking space at that point, and this tendency seems to appear due to the knowledge or sensibilities of the drivers who have learned the cornering characteristics empirically.

Further, this tendency in the travel pattern 2 utilized to estimate the angle β of the parking space may be utilized adequately in the case where only one obstacle adjacent to the parking space is detected. For example, a similar tendency appears in the case of parking the vehicle in the parking space on the front side of the first obstacle under the situation in which only the first obstacle exists.

In the following, an embodiment of a specific way of estimating the angle is explained with reference to FIG. 8. FIG. 8 is a flowchart of an angle estimation process in the parallel parking mode. The processing routine shown in FIG. 8 is initiated when the parking switch 52 is turned on.

In step 100, the parking mode (parallel parking mode or tandem parking mode) is determined. The parking mode may be specified at the operation of the parking switch 52, or may be estimated or determined based on surrounding conditions detecting means (image recognition using a camera, for example) or map data (map data including information about locations of parking areas and types of them, for example).

In step 110, it is determined whether the intended parking space has been confirmed. In the case of parallel parking, drivers generally tend to start to turn the steering wheel substantially just after the vehicle has passed the intended parking space. In one embodiment, it may be determined that the intended parking space has been confirmed, if such a tendency is detected. Alternatively, in a configuration in which when the parking space is detected the guidance for steering operation, such as "please advance slowly with turning the steering wheel until chime rings", is output, it may be determined that the intended parking space has been confirmed if a steering operation according to the output guidance is detected.

In step 120, it is determined whether obstacles on each side of the intended parking space are detected based on a flag setting status related to the confirmed parking space. In other words, it is determined whether the confirmed parking space is a parking space detected between two obstacles.

Here, the situation in which the parking space is detected between two obstacles corresponds to a situation in which a row of points greater than or equal to a predetermined length (2 m, for example) doesn't exist after the detection completion flag related to the first obstacle has been set, then the tentative flag related to the second obstacle has been set, and then the steering operation for the parking start position is initiated. In this situation, processes from step 130 will be performed.

On the other hand, the situation in which the parking space is not detected between two obstacles corresponds to a situation in which a row of points greater than or equal to a predetermined length (2 m, for example) doesn't exist after the detection completion flag related to the first obstacle has been set, and then the steering operation for the parking start position is initiated before the tentative flag or the detection starting flag related to the second obstacle has been set, or a situation in which a row of points greater than or equal to a predetermined length L1 doesn't exist, then the tentative flag or the detection starting flag related to the second obstacle has been set, and then the steering operation for the parking start position is initiated. In this situation, processes from step 160 will be performed.

In step 130, the amount of change in orientation of the vehicle (hereafter referred to as a deflection angle α) within a section from the point when the first obstacle starts to be detected (when the detection starting flag is set) to the point when detection completion flag is set is calculated by the deflection angle calculating section 43, and then it is determined whether the absolute value |α| of the calculated deflection angle α is smaller than or equal to a predetermined value $\theta_{Thr}$.

The predetermined value $\theta_{Thr}$ is a relatively small value. The predetermined value $\theta_{Thr}$ may be a value within the range from 3 to 10 degrees, for example. The fact that the absolute value |α| of the calculated deflection angle α is smaller than or equal to a predetermined value $\theta_{Thr}$ means that the vehicle is substantially moving straight-ahead. The process of this step 130 discriminates between the aforementioned travel pattern 1 (see FIG. 7A) and the travel pattern 2 (see FIG. 7B).

Here, the deflection angle calculation process performed by the deflection angle calculating section 43 is explained. The respective outputs of the steering angle sensor 16 and vehicle speed sensor 18 (see FIG. 1) are input to the deflection angle calculating section 43 periodically. The deflection angle calculating section 43 calculates the deflection angle α in the aforementioned section based on the respective outputs of the steering angle sensor 16 and vehicle speed sensor 18. It is noted that the sign of the deflection angle α is defined as such that a positive sign corresponds to the clockwise direction and a negative sign corresponds to the counter clockwise direction. Here, in general, the deflection angle α can be calculated by the following formula (1), using minute travel distance ds of the vehicle and curvature γ of roads (γ corresponds to the reciprocal of cornering radius R of the vehicle).

$$\alpha = \int_{-\beta}^{0} \gamma \cdot ds$$

According to this formula (1), the amount of change in orientation of the vehicle within a travel distance of β m (in this example, from the point where the detection starting flag is set to the point where detection completion flag is set) is calculated as the deflection angle α.

The parking assisting ECU 12 of the present embodiment calculates minute deflection angle $\alpha_i$ at every predetermined distance (0.5 m, in this example) based on the following formula (2) which is the transformed formula (1) and is used to calculate the deflection angle α by summing the calculated respective minute deflection angles $\alpha_{1 \sim k}$.

$$\alpha = \sum_{i=1}^{k} \alpha_i \quad \alpha_i = \int_{-0.5}^{0} \gamma \cdot ds$$

At this time, the predetermined distance (0.5 m, in this example) is monitored by integrating in time the output signals of the vehicle speed sensor 18 (i.e., wheel speed pulses). Further, road curvature γ is determined based on the steering angle Ha obtained from the steering angle sensor 16, using the relationship γ=Ha/L·η (where L is the length of the wheelbase, and η is an overall gear ratio of the vehicle, that is to say, the ratio of the steering angle Ha to the steering angle of the wheel), for example. It is noted that the minute deflection angle $\alpha_i$ may be calculated, for instance, by multiplying the road curvature γ obtained every 0.01 m of minute travel distance by that minute travel distance 0.01 m, and integrating these multiplied values obtained every 0.5 m of travel distance. It is noted that the relationship between the road curvature γ and the steering angle Ha may be stored in the ROM of the parking assisting ECU 12 in the form of a map generated based on correlation data obtained in advance on a vehicle type basis. It is noted that it is desirable for the detection results of the steering angle sensor 16 and the vehicle speed sensor 18 to be stored even in the situation where the parking switch 52 is not turned on, as is the case with the detection results of the distance-measuring sensor 70. With this arrangement, when the parking switch 52 is not turned on, it is possible to calculate the deflection angle in the section before the vehicle position at that time. Therefore, it is possible to perform estimation of the angle of the parking space located on the front side of the current vehicle position as soon as the parking switch 52 has been turned on. For this purpose, it is also possible to store only the outputs of the steering angle sensor 16 and the vehicle speed sensor 18 obtained within a predetermined distance before the current vehicle position in the memory 72, using the FIFO technique. With this arrangement, it is possible to efficiently use the capacity of the memory 72.

In this step 130, if it is determined that |α| is smaller than or equal to $\theta_{Thr}$, the process proceeds to step 140, determining that the detected travel pattern is the aforementioned travel pattern 1 (see FIG. 7A). On the other hand, if it is determined that |α| is greater than $\theta_{Thr}$, the process proceeds to step 150, determining that the detected travel pattern is the aforementioned travel pattern 2 (see FIG. 7B).

Figure 9:
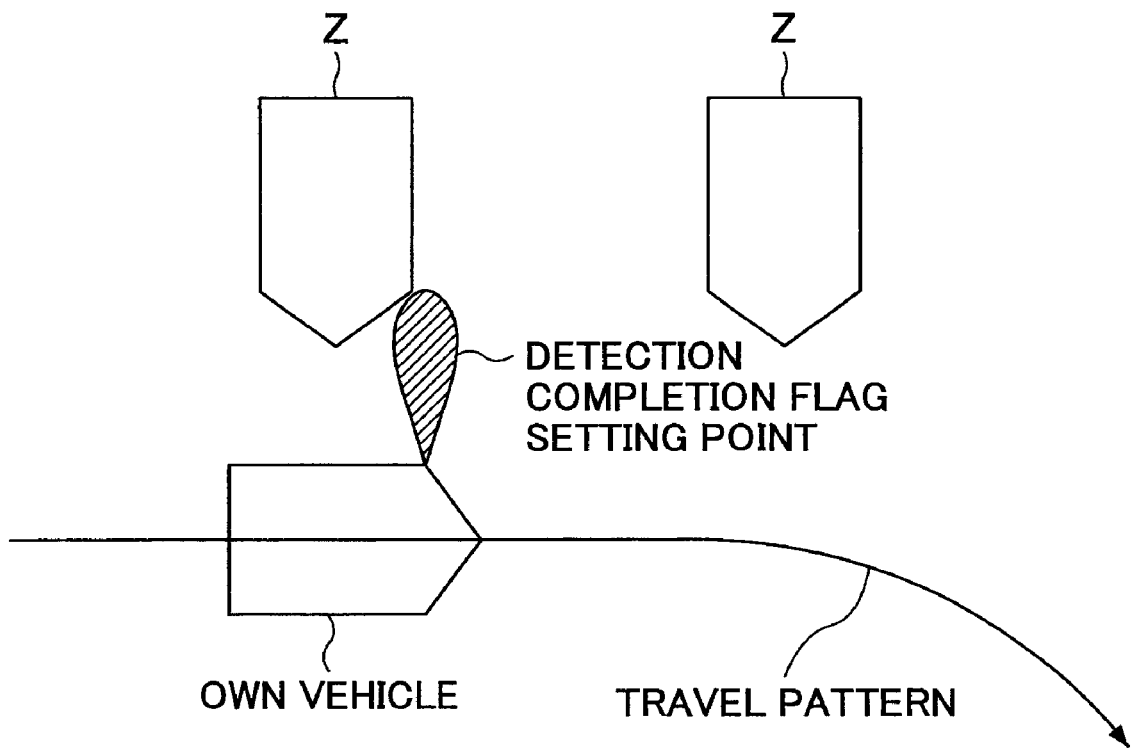
FIG. 9 is a diagram for illustrating estimation logic 1.

In step 140, the angle β of the parking space is estimated using estimation logic 1. The estimation logic 1 is related to the aforementioned travel pattern 1 (see FIG. 7A). With the estimation logic 1, the angle β of the parking space is estimated based on the orientation of the vehicle when the detection completion flag is set with respect to the first obstacle (see FIG. 9). At that time, the angle β of the parking space is estimated as 90 degrees. In other words, the orientation of the parking space is estimated to be perpendicular to the orientation of the vehicle when the detection completion flag is set with respect to the first obstacle.

In step 150, the angle β of the parking space is estimated using estimation logic 2. With the estimation logic 2, the angle β of the parking space is estimated based on the orientation of the vehicle when the tentative flag is set with respect to the second obstacle (see FIG. 10B). At that time, the angle β of the parking space is estimated as 90 degrees. In other words, the orientation of the parking space is estimated to be perpendicular to the orientation of the vehicle when the tentative flag is set with respect to the second obstacle.

Figure 10A:
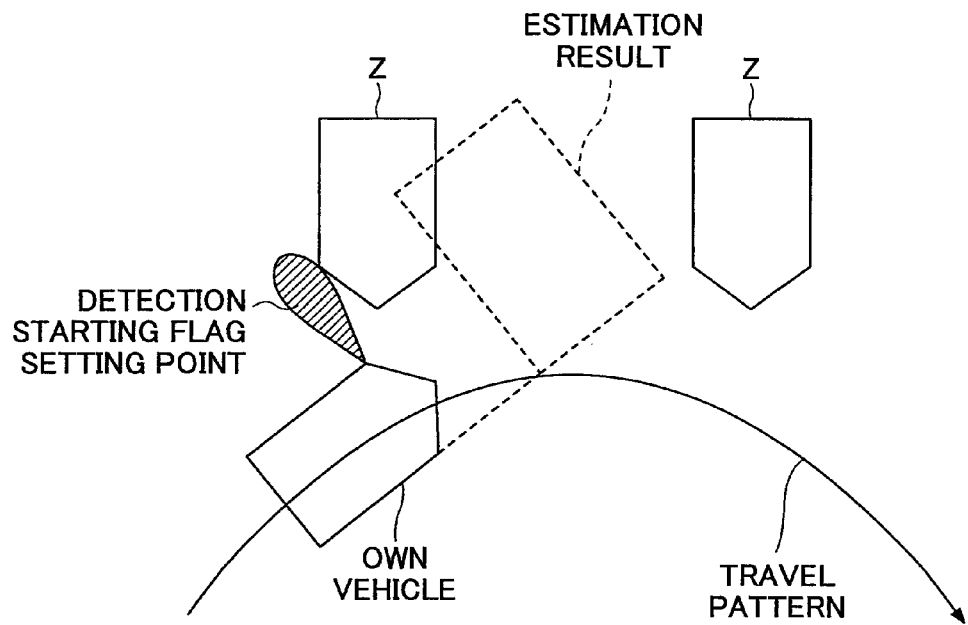
FIG. 10 is a diagram for illustrating estimation accuracy according to estimation logic 2 as a reference.
Figure 10B:
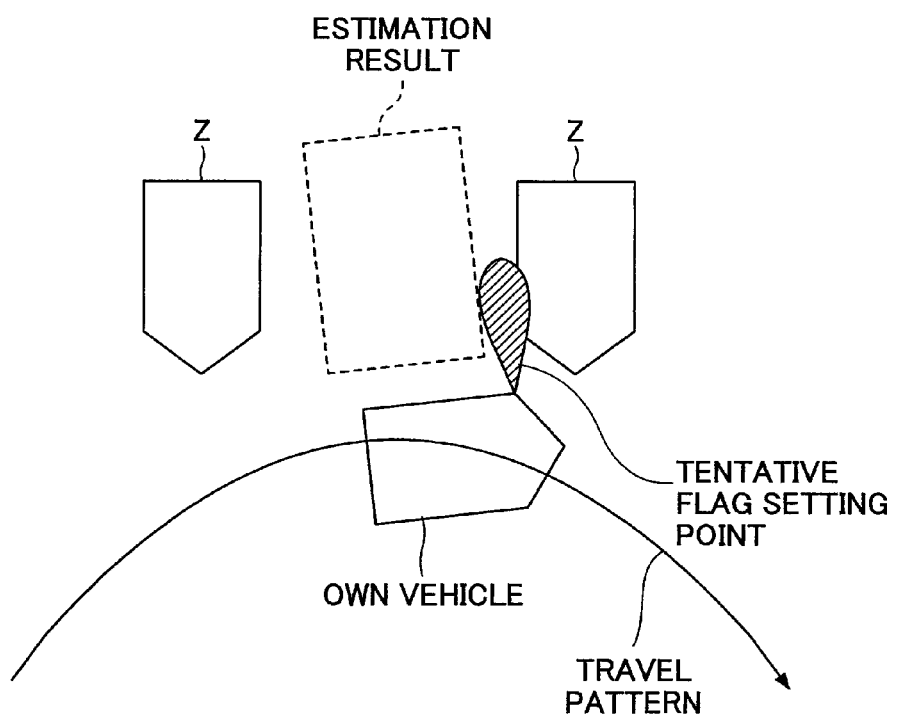

Here, in the comparative example in which the angle β of the parking space is estimated based on the orientation of the vehicle when the vehicle passes near the first obstacle (when the tentative flag is set with respect to the second obstacle, for example), as shown in FIG. 10A, a relatively large error with respect to the actual parking space (due to the angle γ in FIG. 7B) occurs.

On the other hand, it can be assumed that the orientation of the vehicle when the tentative flag is set with respect to the second obstacle is substantially parallel to the front face of the actual parking space, as mentioned above. Thus, with the estimation logic 1, since the angle β of the parking space is estimated based on the orientation of the vehicle which forms a substantially minimal angle with the front face of the actual parking space, as shown in FIG. 10B, it is possible to reduce the estimation error with respect to the actual parking space.

In step 160, it is determined on which side of the intended parking space the obstacle is detected (in a situation where the obstacle is detected on only one side of the intended parking space). Here, if the parking space is detected on the back side of the obstacle, that is to say, if a row of points greater than or equal to a predetermined length (2 m, for example) doesn't exist after the detection completion flag related to the first obstacle has been set, and then a steering operation for the parking start position is initiated before the detection starting flag or the tentative flag related to the second obstacle has been set, then the process proceeds to step 170. On the other hand, if the parking space is detected on the front side of the obstacle, that is to say, if a row of points greater than or equal to a predetermined length L1 doesn't exist and then a steering operation for the parking start position is initiated after the detection starting flag or the tentative flag related to the first obstacle has been set, then the process proceeds to step 180.

Figure 11A:
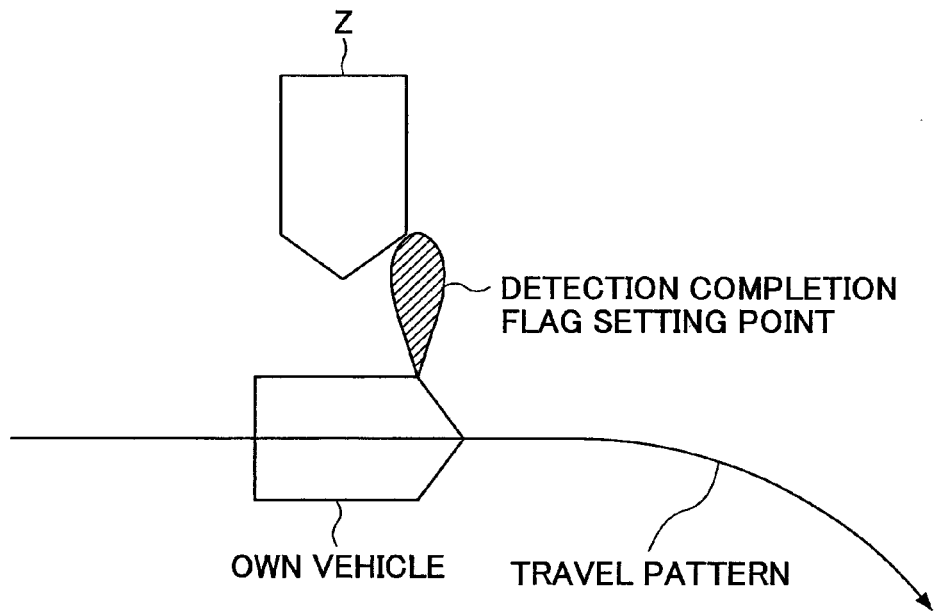
FIG. 11 is a diagram for illustrating estimation logics 3 and 4.

In step 170, the angle β of the parking space is estimated using estimation logic 3. With the estimation logic 3, the angle β of the parking space is estimated based on the orientation of the vehicle when the detection completion flag is set with respect to the first obstacle (see FIG. 11A). At that time, the angle β of the parking space is estimated as 90 degrees. In other words, the orientation of the parking space is estimated to be perpendicular to the orientation of the vehicle when the detection completion flag is set with respect to the first obstacle.

Figure 11B:
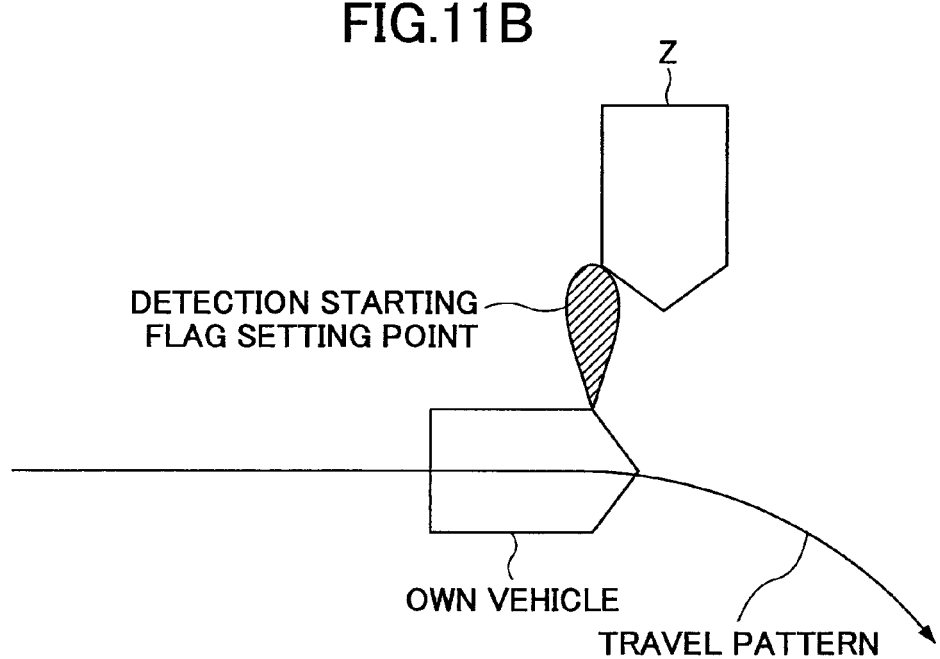

In step 180, the angle β of the parking space is estimated using estimation logic 4. With the estimation logic 4, the angle β of the parking space is estimated based on the orientation of the vehicle when the detection starting flag (or the tentative flag) is set with respect to the first obstacle (see FIG. 11B). At that time, the angle β of the parking space is estimated as 90 degrees. In other words, the orientation of the parking space is estimated to be perpendicular to the orientation of the vehicle when the detection starting flag (or the tentative flag) is set with respect to the first obstacle.

In this way, according to the present embodiment, since the estimation logic is varied according to the number of obstacles adjacent to the parking space and the travel patterns near the parking space, it is possible to precisely estimate the angle β of the parking space under the various situations. In particular, according to the present embodiment, since the travel pattern near the parking space is appropriately determined and the estimation logic suited for the respective travel patterns is applied, it is possible to perform a precise estimation adapted to various travel patterns.

It is noted that although in step 140 the angle β of the parking space is estimated based on the orientation of the vehicle when the detection completion flag is set with respect to the first obstacle, the angle β of the parking space may be estimated based on the orientation of the vehicle at any point within the section from the point when the first obstacle starts to be detected (when the detection starting flag is set, for example) to the point when the detection completion flag is set. This is because the orientation of the vehicle doesn't change greatly within that section. Alternatively, the angle β of the parking space may be estimated based on the orientation of the vehicle at any point within the section, as long as the section is before the orientation of the vehicle starts to change after the detection completion flag is set. In this case, the deflection angle calculating section 43 calculates the deflection angle α' within the section which starts from the point a predetermined distance (7 m, for example) before the current vehicle position and ends at the point of the current vehicle position, based on the respective output signals of the steering angle sensor 16 and vehicle speed sensor 18.

Further, although in step 150 the angle β of the parking space is estimated based on the orientation of the vehicle when the tentative flag is set with respect to the second obstacle, the timing of employing the orientation of the vehicle may be adapted to the cornering characteristics of the individual vehicle, habits of the driver or the like. For example, the angle β of the parking space may be estimated based on the orientation of the vehicle when the detection starting flag is set with respect to the second obstacle, or may be estimated based on the orientation of the vehicle before or after the detection starting flag or the tentative flag is set.

Further, although in step 170 the angle β of the parking space is estimated based on the orientation of the vehicle when the detection completion flag is set with respect to the first obstacle, the angle β of the parking space may be estimated based on the orientation of the vehicle at any point within the section from the point when the first obstacle starts to be detected to the point when the detection completion flag is set. Alternatively, the angle β of the parking space may be estimated based on the orientation of the vehicle at any point within the section, as long as the section is before the orientation of the vehicle starts to change after the detection completion flag is set.

Further, it is also possible to determine the deflection angle from the point which is a predetermined distance before the point where the detection completion flag with respect to the first obstacle is set, in step 170. If the deflection angle is smaller than or equal to the predetermined angle $\theta_{Thr}$, the angle β of the parking space may be estimated based on the orientation of the vehicle when the detection completion flag is set with respect to the first obstacle, determining that the travel pattern 1 is detected. On the other hand, if the deflection angle is greater than the predetermined angle $\theta_{Thr}$, the estimated angle β of the parking space may be corrected appropriately, or the estimation of the angle β of the parking space may be omitted (in this case, the parking assist control for the parking start position is not performed), determining that the travel pattern 2 is detected.

Further, it is also possible not to estimate the angle β of the parking space (in this case, the parking assist control for the parking start position is not performed) in step 180, if only the detection starting flag is set and the tentative flag is not set with respect to the first obstacle. This is because it cannot be said that the obstacle is detected with reliability. Similarly, it is also possible not to estimate the angle β of the parking space, considering that the parking space available flag is not set, even if the tentative flag is set with respect to the first obstacle.

Further, according to the process routine shown in FIG. 8, if the parking space in which the driver intends to park the vehicle is predicted based on the operations of the steering wheel, etc., the angle estimation process for the parking space is performed. However, such angle estimation process can be performed in real time or in non-real time for the respective parking spaces which are detected successively after the parking switch 52 is turned on as the vehicle travels.

[Parking Space Angle Estimation for Tandem Parking]

Figure 12:
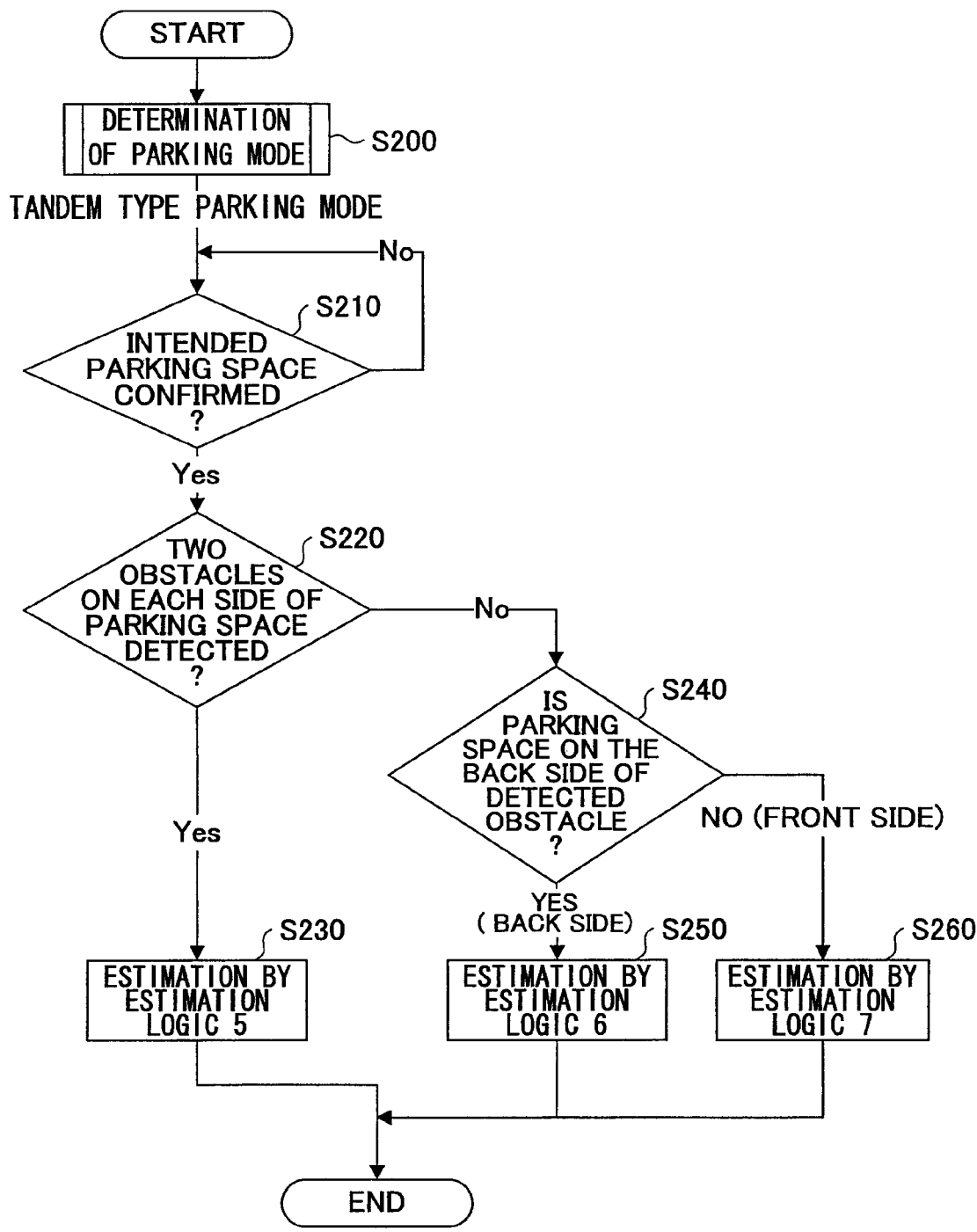
FIG. 12 is a flowchart of an angle estimation process in a tandem parking mode.

FIG. 12 is a flowchart of an angle estimation process in the tandem parking mode. The processing routine shown in FIG. 12 is initiated when the parking switch 52 is turned on. It is noted that processes of step 200 and step 210 may be the same as processes of step 100 and step 110, respectively, and therefore their explanation is omitted.

In step 220, it is determined whether the confirmed parking space is a parking space detected between two obstacles or a parking space detected using only the detection result of one obstacle.

Here, the situation in which the parking space is detected between two obstacles corresponds to a situation in which a row of points greater than or equal to a predetermined length (5.5 m, for example) don't exist after the detection completion flag related to the first obstacle has been set, then the tentative flag related to the second obstacle has been set, and then the vehicle travels straight ahead to the parking start position and stops there. In this situation, the process of step 230 will be performed.

On the other hand, the situation in which the parking space is not detected between two obstacles corresponds to a situation in which a row of points greater than or equal to a predetermined length (6 m, for example) doesn't exist after the detection completion flag related to the first obstacle has been set, and then the vehicle travels straight ahead to the parking start position and stops there before the tentative flag or the detection starting flag related to the second obstacle has been set, or a situation in which a row of points greater than or equal to a predetermined length L2 doesn't exist, then the tentative flag related to the first obstacle has been set, and then the vehicle travels straight ahead to the parking start position and stops there. In this situation, processes from step 240 will be performed.

Figure 13:
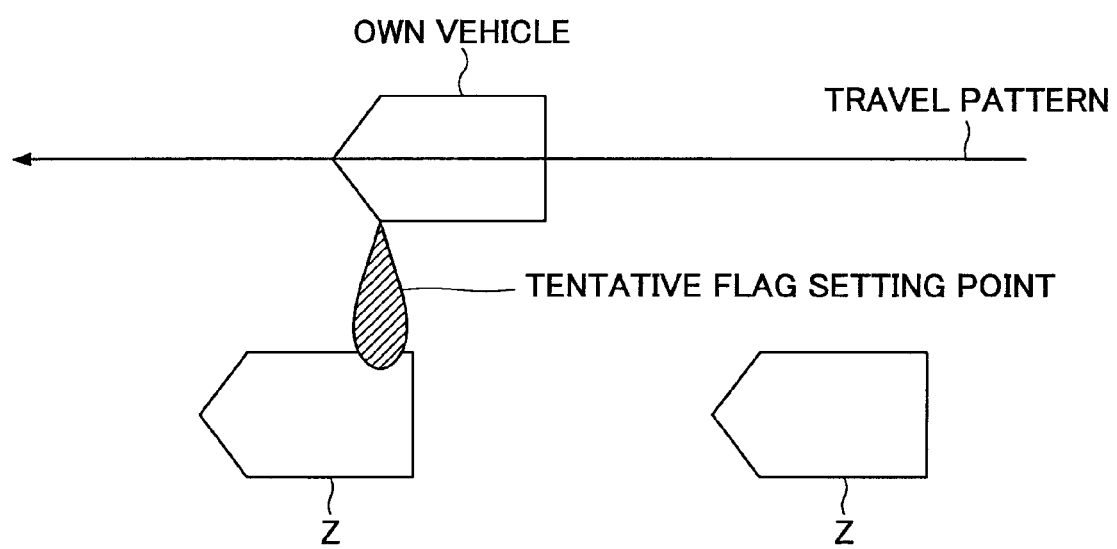
FIG. 13 is a diagram for illustrating estimation logic 5.

In step 230, the angle β of the parking space is estimated using estimation logic 5. With the estimation logic 5, the angle β of the parking space is estimated based on the orientation of the vehicle when the tentative flag is set with respect to the second obstacle (see FIG. 13). At that time, the angle β of the parking space is estimated as 0 degrees. In other words, the orientation of the parking space is estimated to be parallel to the orientation of the vehicle when the tentative flag is set with respect to the second obstacle.

In step 240, it is determined on which side of the intended parking space the obstacle is detected (in a situation where the obstacle is detected on only one side of the intended parking space). Here, if the parking space is detected on the back side of the obstacles, that is to say, if a row of points greater than or equal to a predetermined length (5.5 m, for example) don't exist after the detection completion flag related to the first obstacle has been set, and then the vehicle travels substantially in a straight line and stops before the detection starting flag or the tentative flag related to the second obstacle has been set, then the process proceeds to step 250. On the other hand, if the parking space is detected on the front side of the obstacle, that is to say, if a row of points greater than or equal to a predetermined length L2 doesn't exist and then the vehicle travels substantially in a straight line and stops after the tentative flag related to the first obstacle has been set, then the process proceeds to step 260.

Figure 14A:
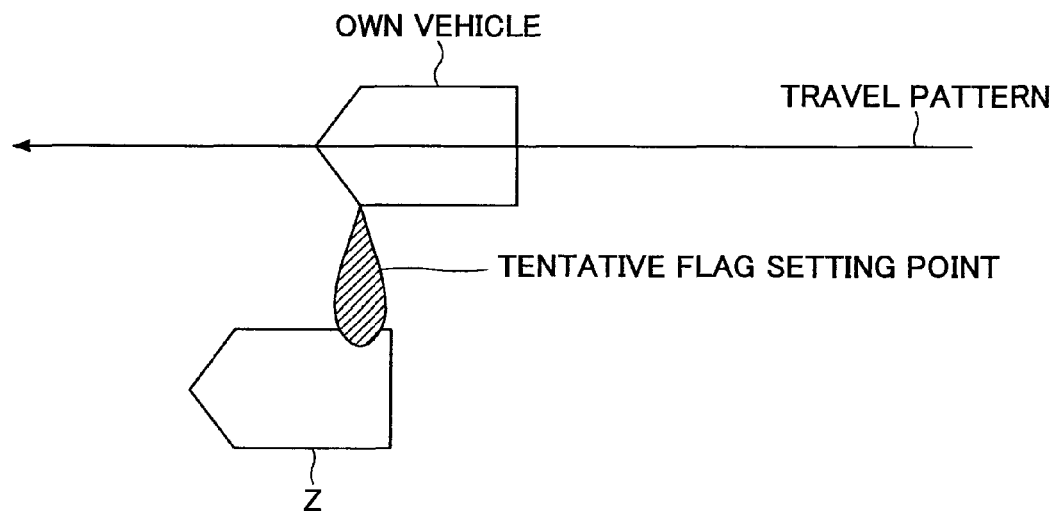
FIG. 14 is a diagram for illustrating estimation logics 6 and 7.

In step 250, the angle β of the parking space is estimated using estimation logic 6. With the estimation logic 5, the angle β of the parking space is estimated based on the orientation of the vehicle when the tentative flag is set with respect to the first obstacle (see FIG. 14A). At that time, the angle β of the parking space is estimated as 0 degrees. In other words, the orientation of the parking space is estimated to be parallel to the orientation of the vehicle when the tentative flag is set with respect to the first obstacle.

Figure 14B:
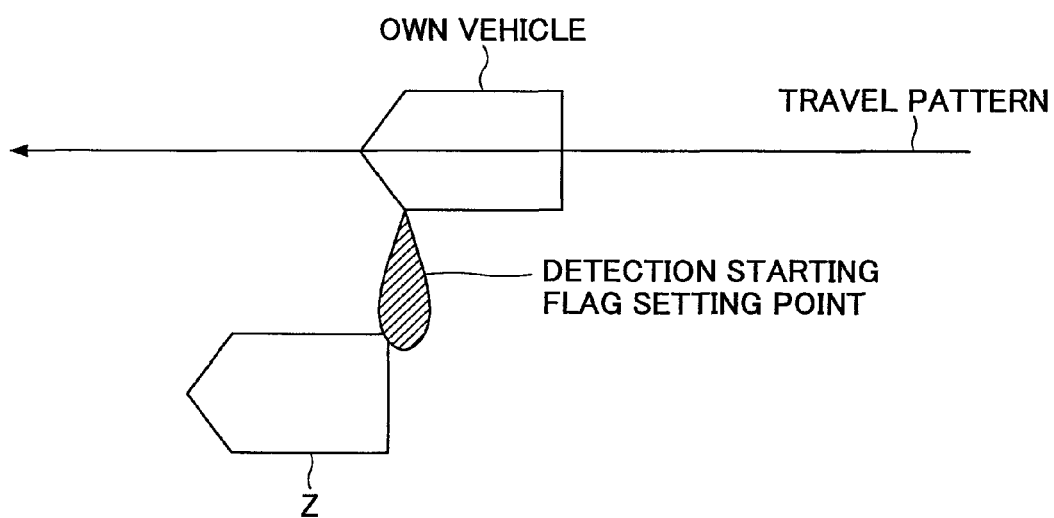

In step 260, the angle β of the parking space is estimated using estimation logic 6. With the estimation logic 6, the angle β of the parking space is estimated based on the orientation of the vehicle when the detection starting flag is set with respect to the first obstacle (see FIG. 14B). At that time, the angle β of the parking space is estimated as 0 degrees. In other words, the orientation of the parking space is estimated to be parallel to the orientation of the vehicle when the detection starting flag is set with respect to the first obstacle.

In this way, according to the present invention, since the estimation logic is varied according to the number of obstacles adjacent to the parking space, it is possible to precisely estimate the angle β of the parking space under the various situations. Further, by preparing the estimation method of FIG. 8 and the estimation method of FIG. 11, and varying the estimation method of estimation of the angle β of the parking space according to the parking mode, it becomes possible to estimate the angle β of the parking space with high accuracy in the respective parking modes.

It is noted that although in step 230 the angle β of the parking space is estimated based on the orientation of the vehicle when the detection completion flag is set with respect to the second obstacle, the angle β of the parking space may be estimated based on the orientation of the vehicle at any point within the section from the point when the second obstacle starts to be detected (when the detection starting flag is set, for example) to the point when the detection completion flag is set. Alternatively, the angle β of the parking space may be estimated based on the orientation of the vehicle at any point within the section from the point when the detection starting flag is set to the point when the vehicle has reached the parking start position, as long as the orientation of the vehicle doesn't change greatly in that section. In this case, the deflection angle calculating section 43 calculates the deflection angle α' within the section which starts from the point a predetermined distance (7 m, for example) before the current vehicle position and ends at the point of the current vehicle position, based on the respective output signals of the steering angle sensor 16 and vehicle speed sensor 18, after the detection starting flag is set at the latest.

Further, although in step 250 the angle β of the parking space is estimated based on the orientation of the vehicle when the tentative flag is set with respect to the first obstacle, it is also possible to estimate it based on the orientation of the vehicle in another location of the vehicle, as long as the orientation of the vehicle doesn't change greatly before and after the tentative flag is set with respect to the first obstacle. In this case, the deflection angle calculating section 43 calculates the deflection angle α' within the section which starts from the point a predetermined distance (7 m, for example) before the current vehicle position and ends at the point of the current vehicle position, based on the respective output signals of the steering angle sensor 16 and vehicle speed sensor 18, before or after the tentative flag is set at the latest.

Further, although in step 260 the angle β of the parking space is estimated based on the orientation of the vehicle when the detection starting flag is set with respect to the first obstacle, it is also possible to estimate it based on the orientation of the vehicle when the tentative flag or the detection completion flag is set with respect to the first obstacle, if such a flag is set with respect to the first obstacle. Similarly, it is also possible to estimate the angle β of the parking space based on the orientation of the vehicle in another location of the vehicle, as long as the orientation of the vehicle doesn't change greatly before and after the detection starting flag is set with respect to the first obstacle.

Further, it is also possible not to estimate the angle β of the parking space (in this case, the parking assist control for the parking start position is not performed) in step 260, if only the detection starting flag is set and the tentative flag is not set with respect to the first obstacle. This is because it cannot be said that the obstacle is detected with reliability.

Further, according to the process routine shown in FIG. 12, if the parking space in which the driver intends to park the vehicle is predicted based on the stop operation of the vehicle, etc., the angle estimation process for the parking space is performed. However, such angle estimation process can be performed in real time or in non-real time for the respective parking spaces which are detected successively after the parking switch 52 is turned on as the vehicle travels.

Next, the way of assisting the parking after determination of the angle β of the parking space is explained.

The parking start position calculating section 44 uses the detection result of the parking space and the estimated angle β of the parking space to calculate the parking start position with which the parking assist for the parking space is possible. For example, the parking start position calculating section 44 determines the target parking direction in the parking space (i.e., determining a direction in which the vehicle should be parked in the parking space) based on the estimated angle β of the parking space, and determines the target parking position (the position of the center of the rear axle of the vehicle in the parking space, for example), based on the end point of the obstacle adjacent to the parking space (i.e., the obstacle(s) related to the set tentative flag or detection completion flag). After determining the target parking direction and the target parking position, the parking start position calculating section 44 considers the maximum cornering curvature of the vehicle, etc., to determine the parking start position (including the direction at the beginning of traveling for parking) with which parking with the determined target parking direction and target parking position is possible. After the parking start position is determined, the parking assist for guiding the vehicle to the parking start position may be carried out. For example, in the case of parallel parking, when the parking space available flag is set, the audio message or text message, such as "please advance slowly while turning the steering wheel until the chime rings", may be output together with the voice. Further, if necessary, the audio message or text message, such as "please start after moving toward the parking space a little bit more", "please start after moving away from the parking space a little bit more", "please start after increasing the inclination of the vehicle a little bit more", etc., may be output based on the relationship between the current vehicle position (and the direction) and the parking start position.

After the angle β of the parking space is determined, the deflection angle calculating section 43 calculates the deflection angle α' of the vehicle in a predetermined section based on the respective output signals of the steering angle sensor 16 and the vehicle speed sensor 18. The predetermined section is a section from the position which is 7 m before the current vehicle position to the current vehicle position, by setting β=7 in the aforementioned formula (1).

After the angle β of the parking space is determined, the target track calculating section 48 tracks the change in the angle β of the parking space based on the deflection angle α' calculated by the deflection angle calculating section 43 until the vehicle has finally reached the parking start position, in order to calculate the angle β' of the parking space when the vehicle has reached the parking start position. It is noted that when the vehicle has reached the parking start position, an audio message for urging the driver to stop the vehicle ("Please stop and return the position of the steering wheel to its original position", for example) may be output and/or automatic braking may be performed.

Figure 15:
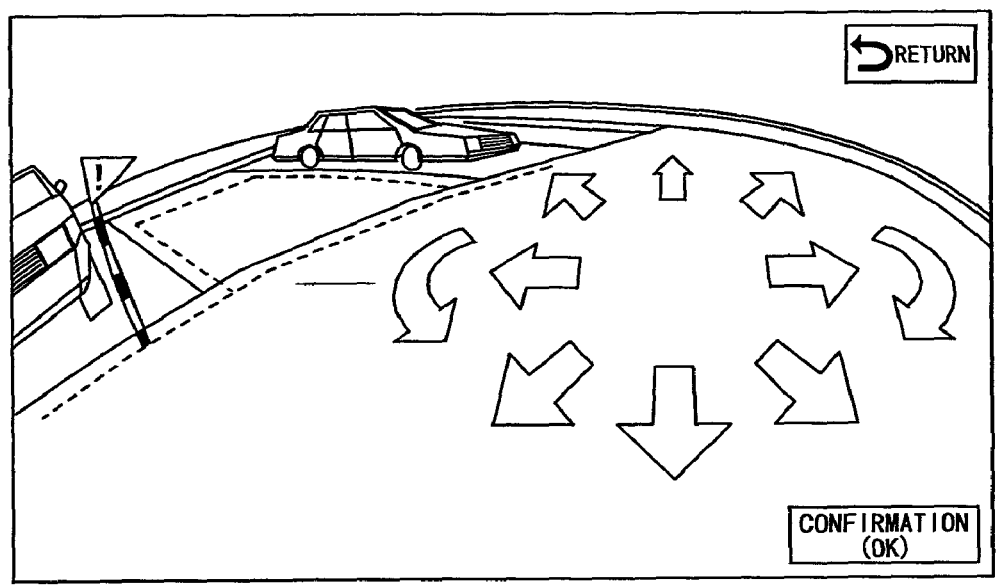
FIG. 15 is an image of an example of a touch switch panel for setting a target-parking position on the display 22.

Next, the parking assist which may be performed when the vehicle rolls backward from the parking start position to the parking space is explained with reference to FIGS. 15 and 1.

When the reverse shift switch 50 is turned on in the parking start position, the parking assisting ECU 12 displays the image (real image) captured by the back monitoring camera 20, which images a scene behind the vehicle with a predetermined viewing angle, on the display 22 provided in the cabin. Then, a target parking frame is superposed on the captured image on the display 22, as shown in FIG. 15 (screen for parallel parking). The target parking frame may be a pictorial display which imitates an actual parking frame or an outside shape of the vehicle. For example, the target parking frame may have a form whose position and direction users can recognize. Two types of target parking frames may be prepared for parallel parking and tandem parking, respectively.

The initial position and direction of the target parking frame displayed on the display 22 is determined based on the detected position and the estimated angle $\beta'$ of the parking space as mentioned above. The initial position and direction of the target parking frame may be confirmed by the user as they are, when the user operates the confirmation switch, for example. Or, the position and direction of the target parking frame may be adjusted with touch switches, etc., for moving the target parking frame in lateral and longitudinal directions and in directions of rotation, as shown in FIG. 15, before operating the confirmation switch.

When the position and direction of the target parking frame are confirmed, the target track calculating section 48 of the parking assisting ECU 12 determines the resultant target parking direction and target parking position, and determines a target track to implement the determined target parking direction and target parking position. When the vehicle starts to roll backward, the parking assisting ECU 12 estimates the position of the vehicle during the parking assist control using the travel distance of the vehicle derived from the output signals of the vehicle speed sensor 18 and the steering position derived from the output signals of the steering angle sensor 16. Then, the parking assisting ECU 12 calculates a target steering angle as a function of the amount of departure of the estimated vehicle position from the target track. The parking assisting ECU 12 transmits the calculated target steering angle to the steering system ECU 30. The steering system ECU 30 controls the motor 32 so as to implement the target steering angle. The motor 32 may be disposed in a steering column for rotating a steering shaft by its rotating angle.

It is noted that the target track calculating section 48 may estimate the position of the vehicle during the parking-assist control based on the output signals of the steering angle sensor 16 and the vehicle speed sensor 18, calculate a target track based on the difference between the target track previously calculated and the vehicle position estimated by the vehicle position estimating section 40, and determine a target steering angle at the vehicle position based on the calculated target track. This calculation of the target track may be performed at every predetermined travel distance of the vehicle (0.5 m, for example). At that time, the target track calculating section 48 may correct the target parking direction and the target parking position (and thus recalculate the target track), if necessary, based on the results of the parking frame recognition process for the captured image of the back monitoring camera 20.

The parking assisting ECU 12 requests the driver to stop the vehicle (or controls the vehicle to stop automatically using the automatic braking system) when the vehicle finally arrives at the target parking position in the target parking direction within the parking space, and then terminates the parking assist control.

The present invention is disclosed with reference to the preferred embodiments. However, it should be understood that the present invention is not limited to the above-described embodiments, and variations and modifications may be made without departing from the scope of the present invention.

For example, although in the above-described embodiments the travel pattern 1 and the travel pattern 2 are distinguished based on the deflection angle $\alpha$ within a section from the point where the detection starting flag is set with respect to the first obstacle to the point where the detection completion flag is set with respect to the first obstacle, the start point or end point of the section may be changed. For example, the deflection angle $\alpha$ within a section from the point where the tentative flag is set with respect to the first obstacle to the point where the detection completion flag is set with respect to the first obstacle, the deflection angle $\alpha$ within a section from the point which is a predetermined distance before a reference point to the reference point which is before or after the point where the detection completion flag is set with respect to the first obstacle, or the deflection angle $\alpha$ within a section where the vehicle passes in front of the front face of the obstacle may be used instead.

Further, although in the above-described embodiments the angle $\beta$ of the parking space is determined in relation to the orientation of the vehicle, the angle $\beta$ of the parking space may be determined in relation to another directional reference (the line connecting two points selected from the row of points representing the obstacle near the parking space, for example) which uniquely corresponds to the orientation of the vehicle at the time of estimation. Further, the angle $\beta$ of the parking space may be determined absolutely based on an absolute azimuth (detection result of declinometer or GPS, for example) representing the orientation of the vehicle at the time of estimation.

Further, although in the above-described embodiments the information as to the orientation of the vehicle is obtained and derived from the vehicle speed sensor 18, the steering angle sensor 16 and the deflection angle calculating section 43, the detection results of the yaw rate sensor, the gyroscopic sensor, the declinometer, the GPS, etc., may be used in addition to it or instead of it.

Further, in the above-described embodiments, the data of a row of points of the distance-measuring sensor 50 outputs are utilized only for the detection of the parking space and the determination of the positional and directional relationships between the obstacle(s) and the vehicle, in order to enable the estimation of the angle $\beta$ of the parking space with the simplified configuration. However, in addition to it, it is also possible to determine the orientation of the obstacle by applying liner approximation or approximation of functions to the data of the row of points the distance-measuring sensor 50 outputs, and perform the estimation of the angle $\beta$ of the parking space additionally using the determined orientation of the obstacle.

Further, in the above-described embodiments, the estimation processes shown in FIGS. 8 and 11 may have other conditions to be performed. For example, the estimation processes shown in FIGS. 8 and 11 may be performed only if the vehicle speed is low within a predetermined range. In particular, the estimation processes shown in FIG. 11 may be performed if $|\alpha'|<\theta2$, where $|\alpha'|$ is the absolute value of the deflection angle $\alpha$ within a section whose length is 7 m. In this case, $\theta2$ is a relatively small angle and may be 8 degrees, for example.

Further, although in the above-described embodiments various applications are initiated when the parking switch 52 is turned on, the present invention is not limited to this configuration. For example, they may be initiated if the vehicle speed is lower than a predetermined speed and it is determined that the vehicle position is located in the parking area based on the map data of the navigation device, even in the condition where the parking switch 52 is not turned on. In this case, such a configuration where there is no parking switch 52 can be contemplated.

Further, although in the above-described embodiments the distance-measuring sensor 70 suited for detecting the obstacle is used, it is also possible to detect the obstacle by means of image recognition of the camera.

Further, although in the above-described embodiments the obstacle is assumed to be a vehicle for the purpose of convenience of explanation, the obstacle may include any tangible goods such as a bicycle, a motorbike, walls, more than two pylons, etc.

The present application is based on Japanese Priority Application No. 2006-120973, filed on Apr. 25, 2006, the entire contents of which are hereby incorporated by reference.

The invention claimed is:

1. A parking assisting apparatus for assisting parking a vehicle, comprising:
    obstacle detecting means for detecting one or more obstacles near the vehicle, the one or more obstacles being circumnavigated when parking the vehicle in a parking space adjacent to the one or more obstacles; and
    orientation information acquiring means for acquiring orientation information as to an orientation of the vehicle relative to a prior orientation of the vehicle,
    wherein said apparatus estimates an orientation of the parking space based on a detection result of the obstacle detecting means and acquired orientation information of the orientation of the vehicle.

2. The parking assisting apparatus as claimed in claim 1, wherein, if the orientation of the vehicle changes greater than or equal to a predetermined angle after a first obstacle is detected, said apparatus estimates the orientation of the parking space based on the acquired orientation information of the orientation of the vehicle at a time when a second obstacle is detected near the vehicle.

3. The parking assisting apparatus as claimed in claim 2, wherein, if the orientation of the vehicle changes less than the predetermined angle after the first obstacle is detected, said apparatus estimates the orientation of the parking space based on the acquired orientation information of the orientation of the vehicle at a time the first obstacle is detected near the vehicle.

4. The parking assisting apparatus as claimed in claim 3, wherein, if the second obstacle is not detected within a predetermined distance traveled by the vehicle away from the first obstacle after the first obstacle is detected, said apparatus estimates the orientation of the parking space based on the acquired orientation information of the orientation of the vehicle at the time the first obstacle is detected near the vehicle.

5. The parking assisting apparatus as claimed in claim 2, wherein, if the second obstacle is not detected within a predetermined distance traveled by the vehicle away from the first obstacle after the first obstacle is detected, said apparatus estimates the orientation of the parking space based on the acquired orientation information of the orientation of the vehicle at a time when the first obstacle is detected near the vehicle.

6. The parking assisting apparatus as claimed in claim 2, wherein an amount of change of the orientation of the vehicle is a deflection angle that is determined based on output data from a steering angle sensor and a vehicle speed sensor.

7. The parking assisting apparatus as claimed in claim 6, wherein the amount of change of the deflection angle is calculated from a point when the first obstacle starts to be detected to a point when detection of the first obstacle is complete.

8. The parking assisting apparatus as claimed in claim 1, wherein, if the orientation of the vehicle changes less than a predetermined angle after a first obstacle is detected, said apparatus estimates the orientation of the parking space based on the acquired orientation information of the orientation of the vehicle at a time the first obstacle is detected near the vehicle.

9. The parking assisting apparatus as claimed in claim 8, wherein, if a second obstacle is not detected within a predetermined distance traveled by the vehicle away from the first obstacle after the first obstacle is detected, said apparatus estimates the orientation of the parking space based on the acquired orientation information of the orientation of the vehicle at the time when the first obstacle is detected near the vehicle.

10. The parking assisting apparatus as claimed in claim 1, wherein, if a second obstacle is not detected within a predetermined distance traveled by the vehicle away from a first obstacle after the first obstacle is detected, said apparatus estimates the orientation of the parking space based on acquired orientation information of the orientation of the vehicle at a time when the first obstacle is detected near the vehicle.

11. A parking assisting method of assisting parking a vehicle, comprising:
    detecting one or more obstacles near the vehicle, the one or more obstacles being circumnavigated when parking the vehicle in a parking space adjacent to the one or more obstacles; and
    acquiring orientation information as to an orientation of the vehicle relative to a prior orientation of the vehicle,
    wherein, if it is determined based on a detection result of the obstacle detecting step and the orientation information acquired in the orientation information acquiring step that the orientation of the vehicle changes greater than or equal to a predetermined angle after a first obstacle is detected, an orientation of the parking space is estimated based on the acquired orientation information of the orientation of the vehicle at a time when a second obstacle is detected near the vehicle.

12. A parking assisting method of assisting parking a vehicle, comprising:
    detecting one or more obstacles near the vehicle, the one or more obstacles being circumnavigated when parking the vehicle in a parking space adjacent to the one or more obstacles; and
    acquiring orientation information as to an orientation of the vehicle relative to a prior orientation of the vehicle,
    wherein, if it is determined based on a detection result of the obstacle detecting step and the orientation information acquired in the orientation information acquiring step that the orientation of the vehicle changes less than a predetermined angle after a first obstacle is detected, an orientation of the parking space is estimated based on the acquired orientation information of the orientation of the vehicle at a time when the first obstacle is detected near the vehicle.

13. A parking assisting method of assisting parking a vehicle, comprising:
    detecting one or more obstacles near the vehicle, the one or more obstacles being circumnavigated when parking the vehicle in a parking space adjacent to the one or more obstacles; and
    acquiring orientation information as to an orientation of the vehicle relative to a prior orientation of the vehicle,
    wherein, if it is determined based on a detection result of the obstacle detecting step and the orientation information acquired in the orientation information acquiring step that a second obstacle is not detected within a predetermined distance traveled by the vehicle away from a first obstacle after the first obstacle is detected, an orientation of the parking space is estimated based on acquired orientation information of the orientation of the vehicle at a time when the first obstacle is detected near the vehicle.

* * * * *